(12) United States Patent
Asai

(10) Patent No.: US 11,048,457 B2
(45) Date of Patent: Jun. 29, 2021

(54) NON-TRANSITORY COMPUTER-READABLE MEDIUM STORING COMPUTER-READABLE INSTRUCTIONS

(71) Applicant: BROTHER KOGYO KABUSHIKI KAISHA, Nagoya (JP)

(72) Inventor: Norihiko Asai, Tajimi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/699,933

(22) Filed: Dec. 2, 2019

(65) Prior Publication Data

US 2020/0104086 A1 Apr. 2, 2020

Related U.S. Application Data

(63) Continuation of application No. 16/408,644, filed on May 10, 2019, now Pat. No. 10,521,174, and a
(Continued)

(30) Foreign Application Priority Data

Jan. 24, 2017 (JP) .................................. 2017-010113

(51) Int. Cl.
*G06F 3/12* (2006.01)
*H04N 1/00* (2006.01)
(52) U.S. Cl.
CPC .......... *G06F 3/1292* (2013.01); *G06F 3/1205* (2013.01); *G06F 3/126* (2013.01);
(Continued)
(58) Field of Classification Search
CPC .... G06F 3/1292; G06F 3/1231; G06F 3/1236; G06F 3/126; G06F 3/1253; G06F 3/1205;
(Continued)

(56) References Cited

U.S. PATENT DOCUMENTS

2011/0023054 A1 1/2011 Yamazaki
2012/0239941 A1* 9/2012 Ono ...................... G06F 21/121
713/189
(Continued)

FOREIGN PATENT DOCUMENTS

JP 2011-28482 A 2/2011
JP 2012-203742 A1 1/2012

OTHER PUBLICATIONS

Office Action in corresponding Japanese Patent Application No. 2017-010113, dated Jan. 5, 2021.

*Primary Examiner* — Frantz Bataille
(74) *Attorney, Agent, or Firm* — Merchant & Gould P.C.

(57) ABSTRACT

A non-transitory computer-readable medium stores computer-readable instructions, the computer-readable instructions, in response to being activated by an operating system, causing the portable terminal to perform: a first acceptance process of accepting an operation designating one of image forming devices communicable; a first storage process of causing the memory to store a first device ID, as a designated device ID; a second acceptance process of accepting an operation designating contents; and an operation instruction process of transmitting operation instruction information, and the computer-readable instructions, in response to being activated by another program, causing the portable terminal to perform: an acquisition process of acquiring, from the another program, a second device ID for identifying the image forming device; and a second storage process of causing the memory to store the second device ID, as the designated device ID.

13 Claims, 12 Drawing Sheets

Related U.S. Application Data continuation of application No. 15/878,112, filed on Jan. 23, 2018, now Pat. No. 10,310,794.

(52) U.S. Cl.
CPC .......... *G06F 3/1231* (2013.01); *G06F 3/1236* (2013.01); *G06F 3/1253* (2013.01); *H04N 1/0044* (2013.01); *H04N 1/00167* (2013.01); *H04N 1/00413* (2013.01); *H04N 1/00493* (2013.01); *G06F 3/1257* (2013.01); *H04N 2201/0075* (2013.01); *H04N 2201/0094* (2013.01)

(58) Field of Classification Search
CPC ....... H04N 2201/0075; H04N 1/00413; H04N 1/00493; H04N 1/0044; H04N 2201/0094; H04N 1/00167
USPC ........................................................ 358/1.15
See application file for complete search history.

(56) References Cited

U.S. PATENT DOCUMENTS

| | | |
|---|---|---|
| 2012/0243043 A1 | 9/2012 | Asai |
| 2015/0116760 A1 | 4/2015 | Kim |
| 2015/0193564 A1 | 7/2015 | Ishiguro |
| 2015/0193674 A1* | 7/2015 | Ishiguro ................ G06F 3/1253 358/1.15 |
| 2020/0073688 A1* | 3/2020 | Yoshida ............. H04N 1/00474 |

* cited by examiner

FIG. 3A

| DEVICE ID | FUNCTION INFORMATION | |
|---|---|---|
| MFP-A | DOUBLE-SIDED PRINTING | POSSIBLE |
| | POSTCARD PRINTING | POSSIBLE |

FIG. 3B

| DEVICE ID | FUNCTION INFORMATION | |
|---|---|---|
| MFP-B | POSTCARD PRINTING | POSSIBLE |

FIG. 3C

| ITEM | PARAMETER |
|---|---|
| SIZE | POSTCARD |
| PAPER TYPE | INKJET PAPER |
| COLOR | BLACK AND WHITE |

FIG. 3D

| ITEM | PARAMETER |
|---|---|
| SIZE | POSTCARD |
| PAPER TYPE | GLOSSY PAPER |
| COLOR | COLOR |

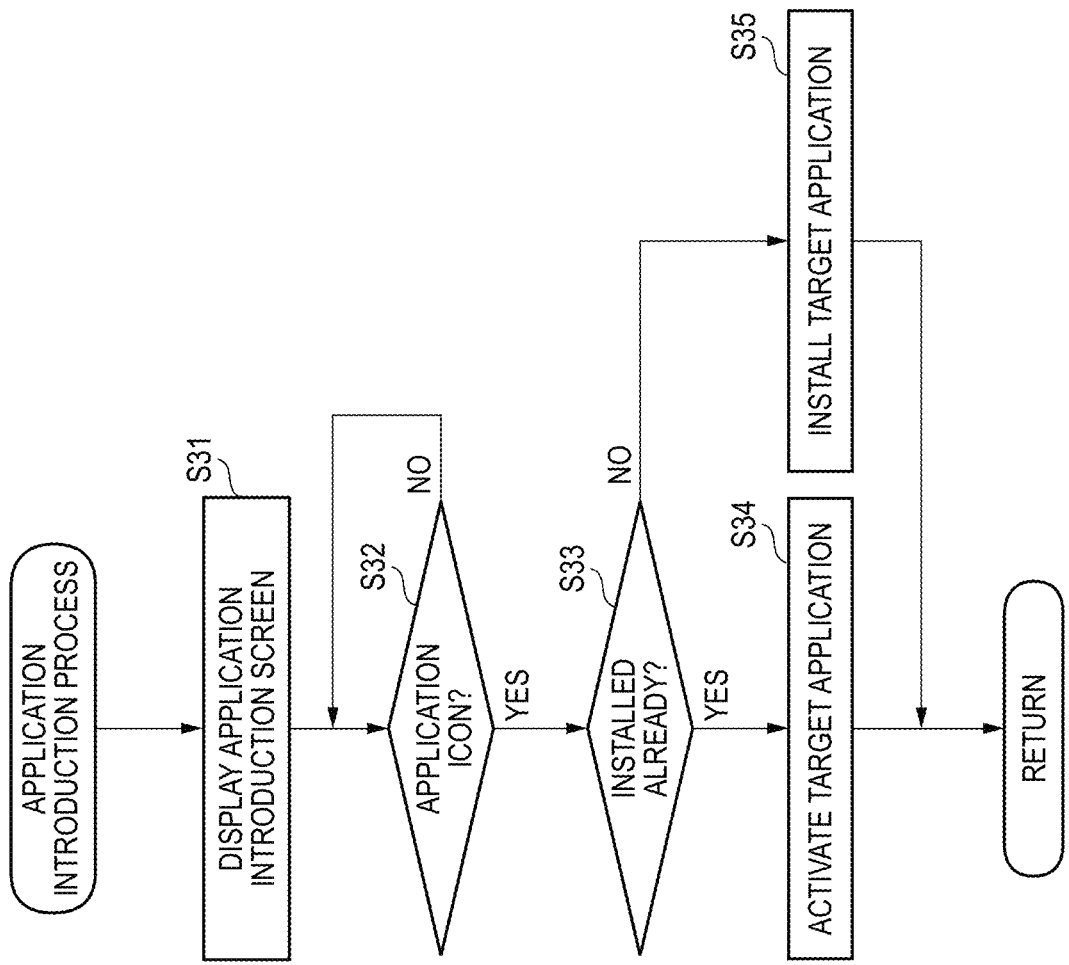
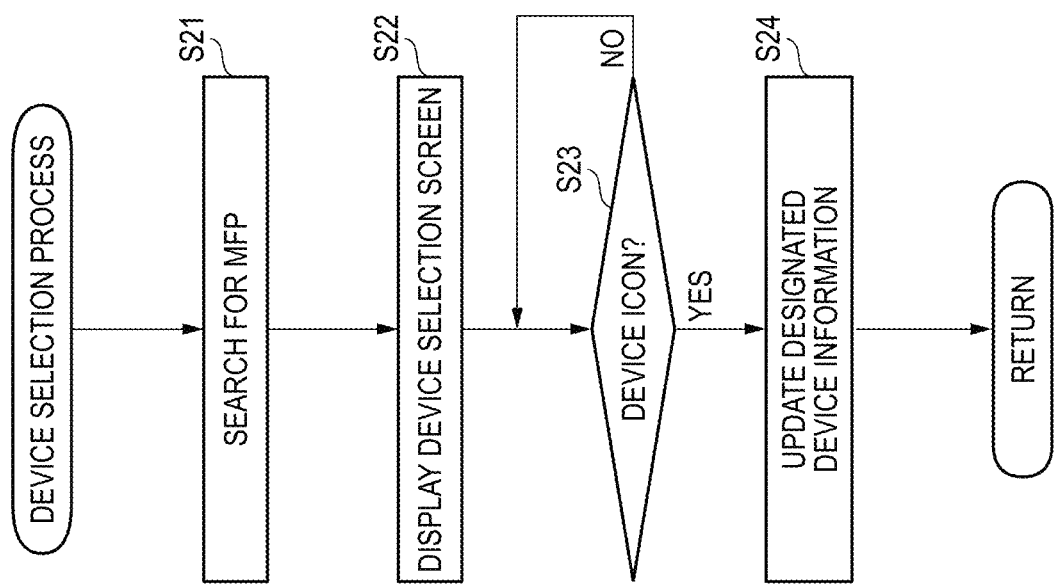

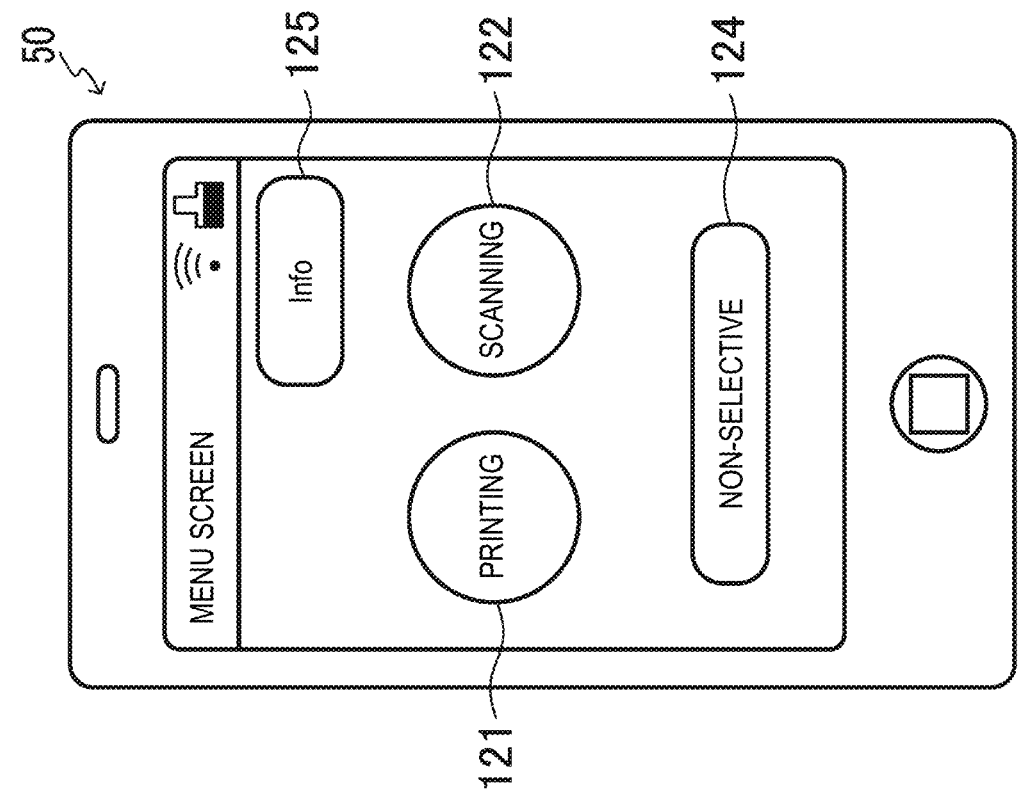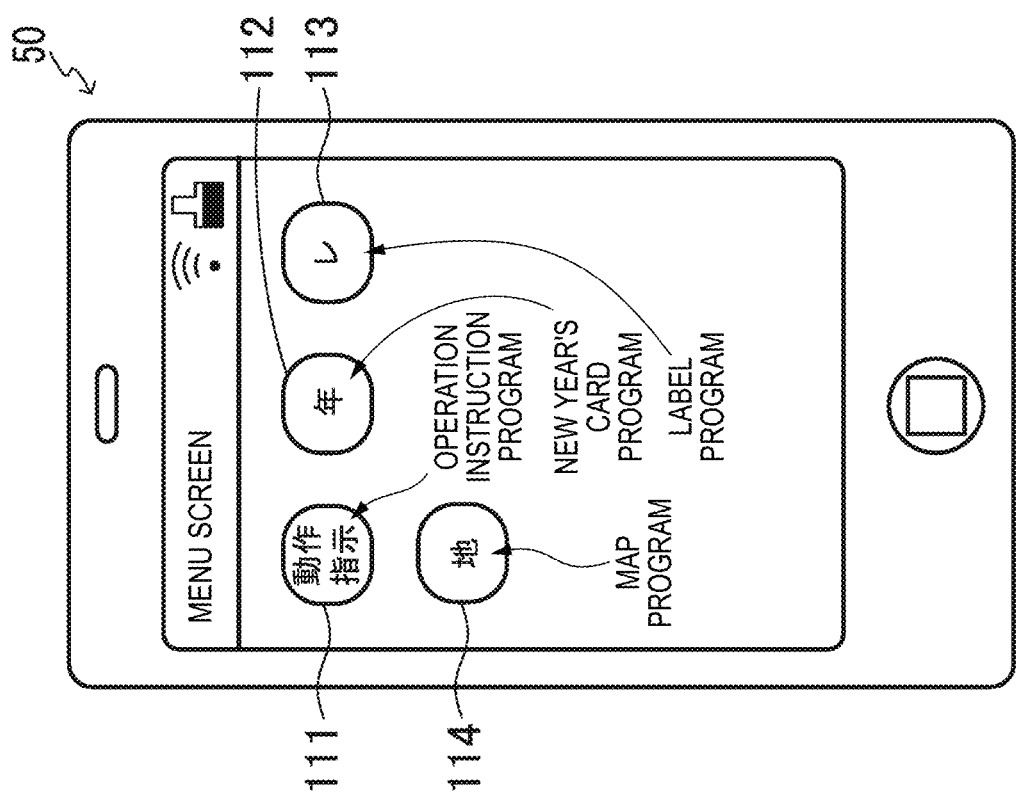

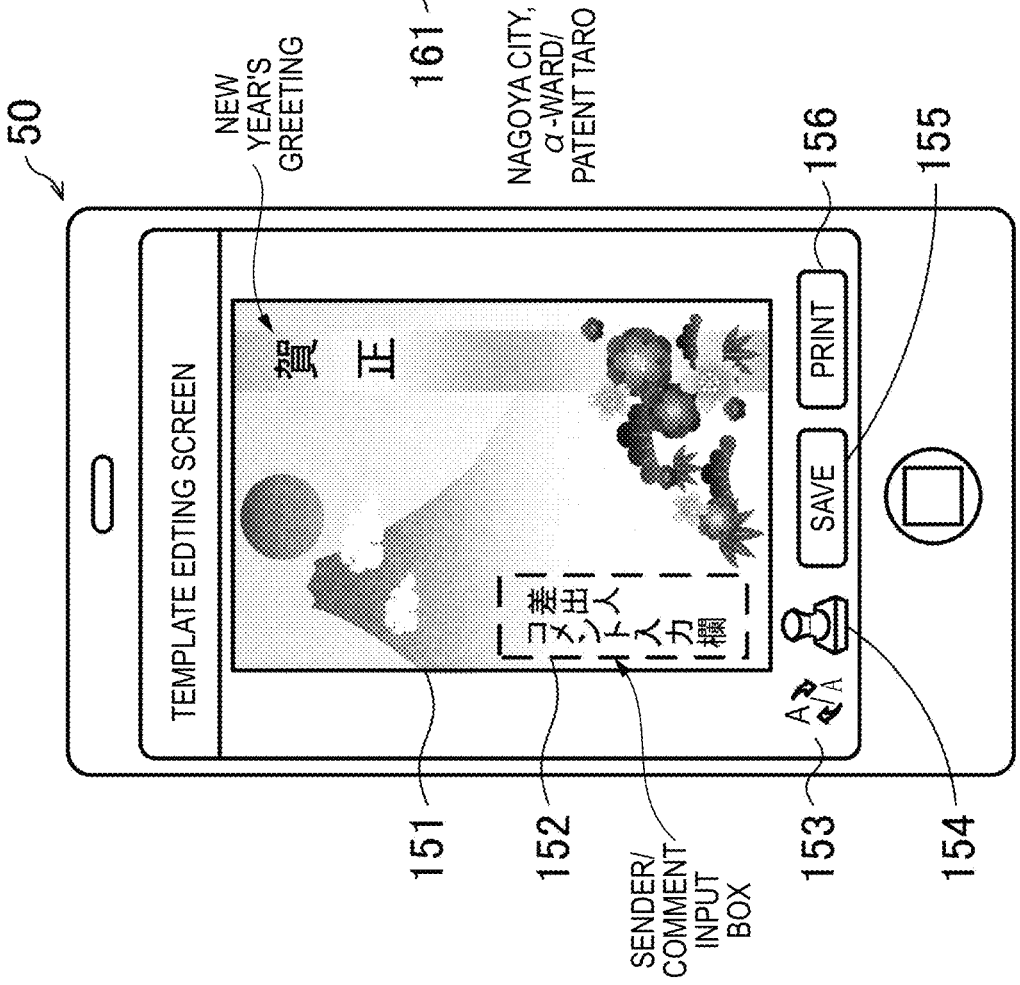

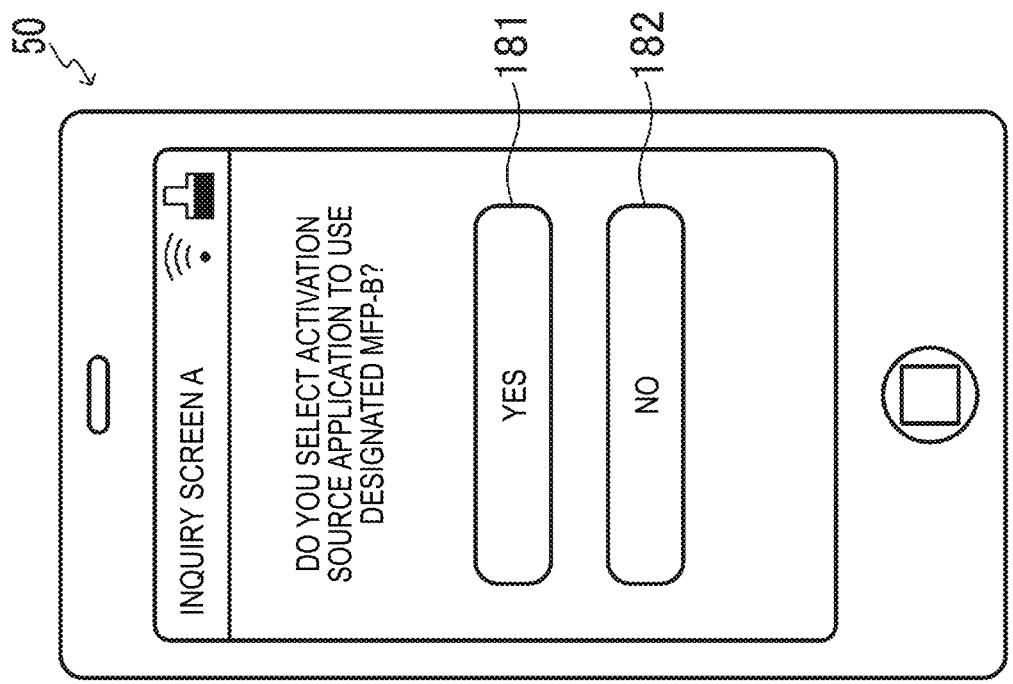
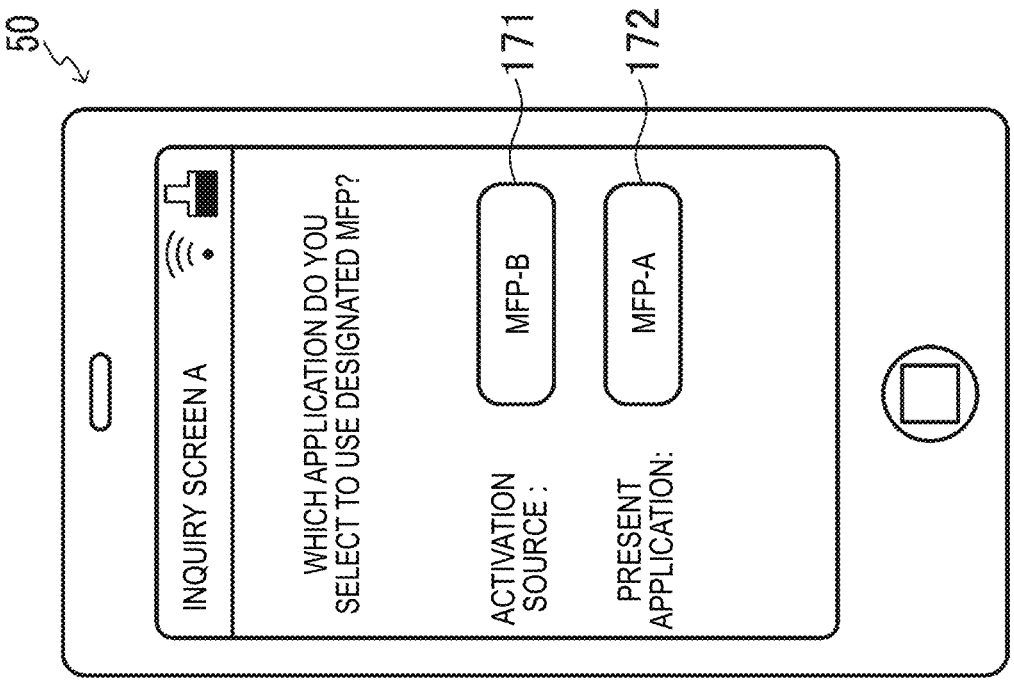

NON-TRANSITORY COMPUTER-READABLE MEDIUM STORING COMPUTER-READABLE INSTRUCTIONS

CROSS-REFERENCE TO RELATED APPLICATION

This application is a continuation of U.S. patent application Ser. No. 16/408,644 filed May 10, 2019, which is a continuation of U.S. patent application Ser. No. 15/878,112 filed Jan. 23, 2018, both of which further claim priority from Japanese Patent Application No. 2017-010113 filed on Jan. 24, 2017. The entire subject matter of all application are incorporated herein by reference.

TECHNICAL FIELD

This disclosure relates to a program of a portable terminal that causes an image forming device to execute an image forming operation.

BACKGROUND

For example, a background art discloses a program (hereinafter, referred to as "first program") that causes an image forming device to execute an image forming operation. More specifically, the first program disclosed in the background art causes an image forming device designated by a user to execute an image forming operation designated by the user.

In addition, the first program having the above-described configuration can activate a program (hereinafter, referred to as "second program") such as a program that substitutes for the function of the first program or a program that supplements the function of the first program. The second program has a function, for example, of providing a user with an interface for editing image data and instructing the image forming device designated by the user for the image forming operation suitable for the image data edited through the interface.

SUMMARY

However, for example, when the second program is activated after the image forming device is designated through the first program, if it is necessary to designate again the image forming device through the second program, there is a problem that the operation becomes complicated.

This disclosure provides a technique for simplifying the operation for designating the image forming device in the second program that can be activated by the first program.

A non-transitory computer-readable medium in this disclosure stores computer-readable instructions to control a portable terminal including a memory, an input interface, and a communication interface, the computer-readable instructions, in response to being activated by an operating system of the portable terminal due to an operation through the input interface, causing the portable terminal to perform: a first acceptance process of accepting an operation, through the input interface, designating one of image forming devices communicable through the communication interface; a first storage process of causing the memory to store a first device ID for identifying the image forming device designated by the first acceptance process, as a designated device ID; a second acceptance process of accepting an operation designating contents of an image forming operation through the input interface; and an operation instruction process of transmitting operation instruction information for causing the image forming operation having the contents designated by the second acceptance process to be performed to the image forming device identified by the designated device ID stored in the memory, through the communication interface, and the computer-readable instructions, in response to being activated by another program stored in the memory, causing the portable terminal to perform: an acquisition process of acquiring, from the another program, a second device ID for identifying the image forming device which is designated by a user caused by the another program; and a second storage process of causing the memory to store the second device ID acquired by the acquisition process, as the designated device ID used in the operation instruction process.

According to the above configuration, when being activated by another program (hereinafter, referred to as "activation source program") installed in the portable terminal, since the program causes the memory to store the second device ID acquired from the activation source program as the designated device ID, the first acceptance process can be skipped. That is, when the image forming device is designated through the activation source program, there is no need to designate the image forming device again through the program, so that the operation for designating the image forming device is simplified.

A non-transitory computer-readable medium of another aspect of this disclosure stores computer-readable instructions to control a portable terminal including a memory, an input interface, and a communication interface. The memory stores one or more external programs that causes: the memory to store a device ID for identifying an image forming device designated through the input interface by a user or a device ID acquired from the program, as a designated device ID; and the image forming device, which is identified by the designated device ID stored in the memory, to perform an image forming operation designated through the input interface by the user. The computer-readable instructions causes the portable terminal to perform: a first acceptance process of accepting an operation designating the image forming device communicable through the communication interface, through the input interface; a second acceptance process of accepting an operation designating contents of the image forming operation through the input interface; an operation instruction process of transmitting operation instruction information for causing the image forming operation having the contents designated in the second acceptance process to be performed to the image forming device designated in the first acceptance process, through the communication interface; a third acceptance process of accepting an operation for designating the external program stored in the memory, through the input interface; and an activation process of activating the external program designated in the third acceptance process and delivering a device ID for identifying the image forming device designated in the first acceptance process.

BRIEF DESCRIPTION OF THE DRAWINGS

The foregoing and additional features and characteristics of this disclosure will become more apparent from the following detailed descriptions considered with the reference to the accompanying drawings, wherein:

FIG. 3A is an example of first designated device information stored in a memory;

FIG. 3B is an example of second designated device information stored in the memory;

FIG. 3C is an example of first condition information stored in the memory;

FIG. 3D is an example of second condition information stored in the memory;

FIG. 5A is a flowchart of a device selection process;

FIG. 5B is a flowchart of an application introduction process;

FIG. 9A is an example of a menu screen displayed on a display;

FIG. 9B is an example of a main screen displayed on the display;

FIG. 11A is an example of a template editing screen displayed on the display;

FIG. 11B is an example of a preview screen displayed on the display;

FIG. 12A is an example of an inquiry screen A displayed on the display; and

FIG. 12B is an example of an inquiry screen B displayed on the display.

DETAILED DESCRIPTION

Hereinafter, referring to the accompanying drawings, an illustrative embodiment according to this disclosure will be described. It should be noted that the illustrative embodiment described hereinafter is only an example of a described configuration and can be modified in various ways without departing from aspects of this disclosure. For example, an order of execution of processes described later could be changed without changing the aspects of this disclosure.

Figure 1:
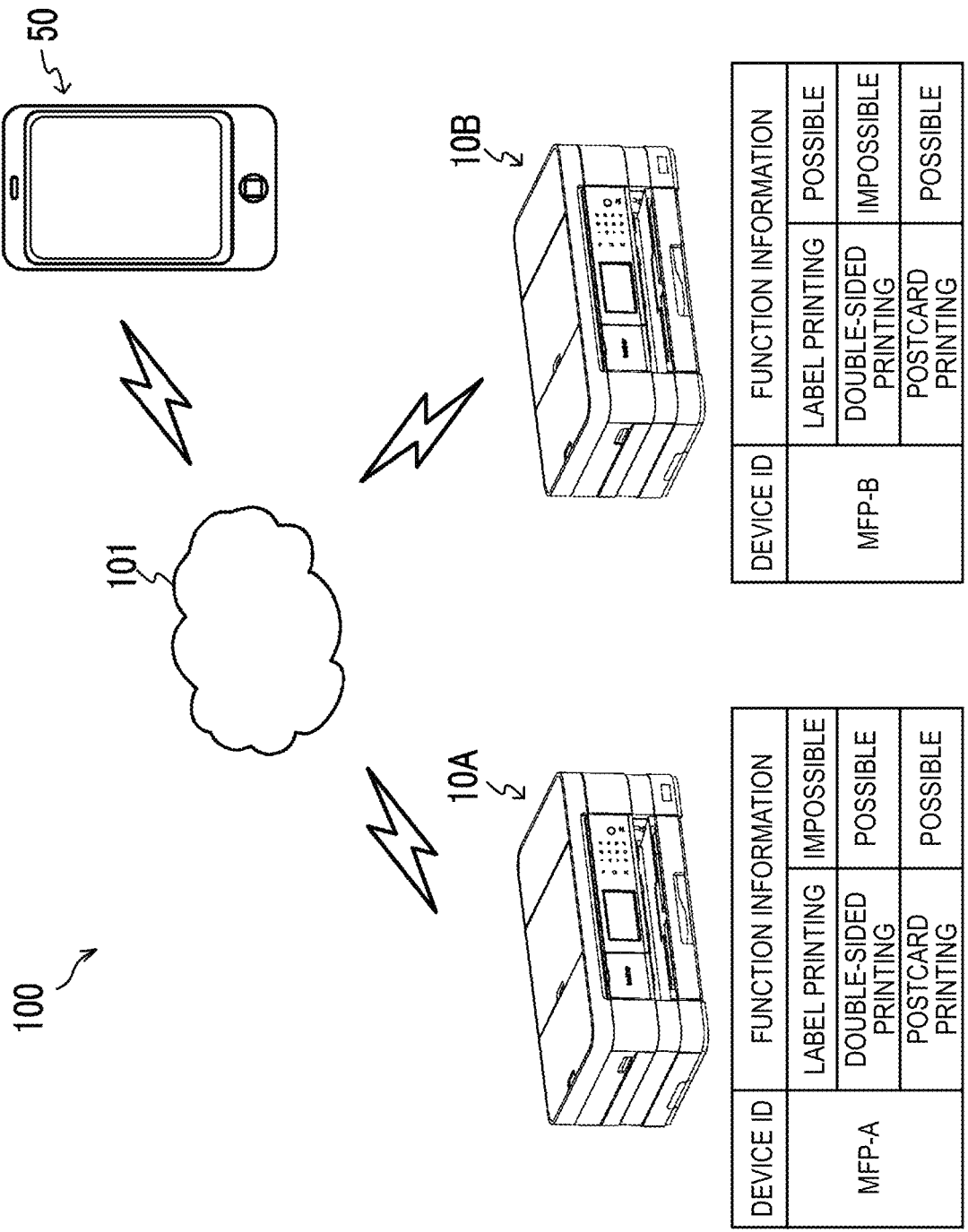
FIG. 1 is a schematic diagram of a system according to an embodiment.

FIG. 1 illustrates a system 100 according to an embodiment of this disclosure. The system 100 shown in FIG. 1 includes MFPs 10A and 10B (hereinafter, which will also be collectively referred to as MFP 10), and a portable terminal 50. The MFP 10 and the portable terminal 50 are configured to communicate with each other through a communication network 101. The communication network 101 may be a wired LAN, a wireless LAN, or combination of the wired LAN and wireless. Alternatively, the MFP 10 and the portable terminal 50 may be connected to each other by a USB cable or the like.

Figure 2A:
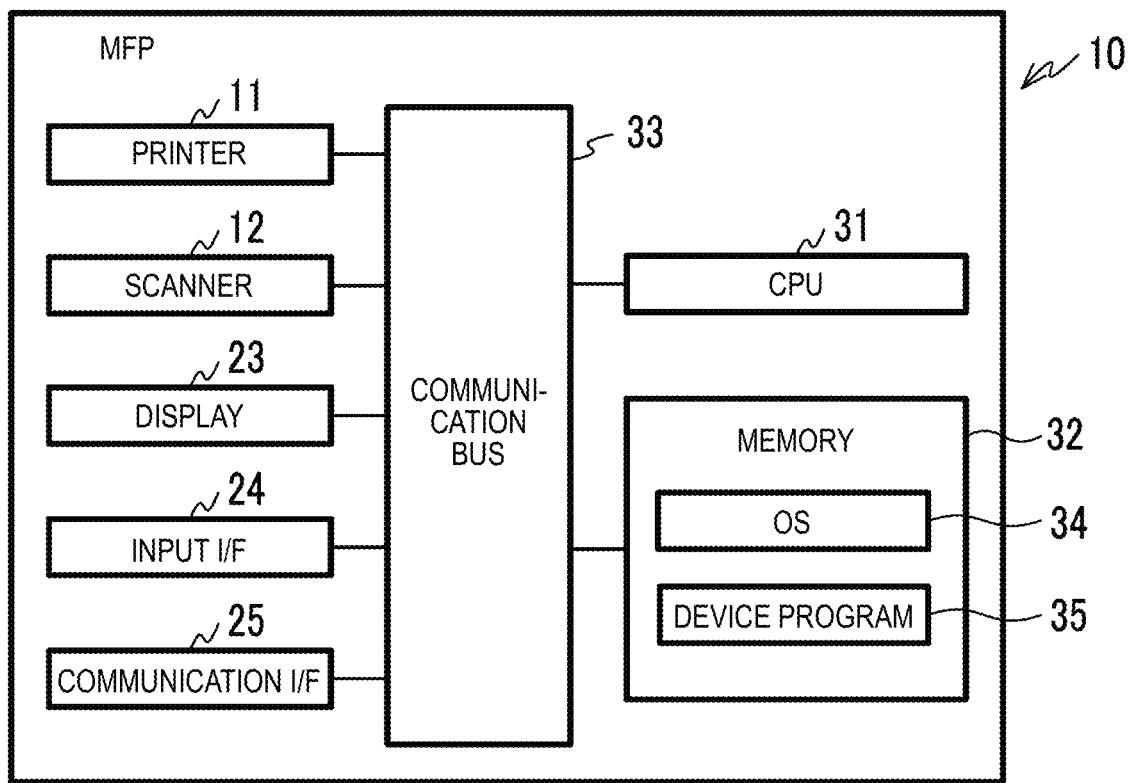
FIG. 2A is a block diagram of an MFP.

The MFP 10 mainly includes, as illustrated in FIG. 2A, a printer 11, a scanner 12, a display 23, an input I/F 24, a communication I/F 25, a CPU 31, a memory 32, and a communication bus 33. Components constituting the MFP 10 are interconnected through the communication bus 33. The MFP 10 is an example of an image forming device.

The printer 11 is hardware configured to execute a printing operation of recording an image represented by image data on a sheet. As a recording method of the printer 11, an inkjet printer 11 for recording an image by discharging ink is described as an example in the embodiment, but an electrophotographic printer may be employed. The scanner 12 is hardware configured to execute a scanning operation of reading an image recorded on a document and generating image data (hereinafter, referred to as "scan data"). The printing operation and the scanning operation are examples of the image forming operation.

Specific examples of the image forming operation are not limited to these operations. The image forming operation may be, for example, a FAX transmitting operation that transmitting image data to an external device according to a FAX protocol with FAX or a FAX receiving operation that receives image data from an external device according to a FAX protocol with FAX. In addition, the MFPs 10A and 10B may be capable of executing at least one image forming operation. Further, the image forming operations executable by the MFPs 10A and 10B may be different from each other.

The printer 11 executes a printing operation according to predetermined execution conditions. The execution conditions of the printing operation are specified by a plurality of parameters corresponding to a plurality of items (for example, "size", "paper type", and "color"). The item "size" indicates the size (for example, "A4", "B5", "Japanese L", or "postcard") of a sheet on which an image is recorded. The item "paper type" indicates the type (for example, "plain paper", "glossy paper", or "inkjet paper") of the sheet on which the image is recorded. The item "color" indicates the gradation (for example, "color" or "black and white") of the color of the image recorded on the sheet.

The scanner 12 executes a scanning operation according to predetermined execution conditions. The execution conditions of the scanning operation are specified by a plurality of parameters corresponding to a plurality of items (for example, "resolution", "color", and "format"). The item "resolution" indicates reading resolution (for example, "300 dpi" or "600 dpi") at the time of reading an image recorded on a document. The item "color" indicates the gradation (for example, "black and white", "256 colors", or "full color") of the color of the read image. The item "format" indicates the file format (for example, "PDF", "TIFF", or "JPEG") of scan data.

Further, the MFP 10 may be capable of executing a specific operation. The specific operation is, for example, an image forming operation that can be executed only by the MFP 10 provided with specific hardware or software. The specific operation may be an image forming operation different from the printing operation, the scanning operation, the FAX transmitting operation, and the FAX receiving operation which are described above, or may be a printing operation, a scanning operation, a FAX transmitting operation, and a FAX receiving operation which are executed according to execution conditions indicating that specific hardware is used. The specific operations according to the embodiment are a label printing operation, a double-sided printing operation, and a postcard printing operation. However, specific examples of the specific operations are not limited to these operations, and may be a part of the printing operation, the scanning operation, the FAX transmitting operation, and the FAX receiving operation, for example.

The label printing operation is a printing operation of recording an image on a disk-shaped recording medium such as CD-ROM. That is, it is necessary that the MFP 10 capable of executing the label printing operation includes not only a sheet but also hardware for conveying the CD-ROM (for example, a mechanism for adjusting a distance between a pair of rollers rotating while holding the recording medium).

The double-sided printing operation is a printing operation of recording images on front and rear surfaces of the sheet. That is, it is necessary that the MFP 10 capable of executing the double-sided printing operation includes hardware for reversing the sheet (for example, a reversing conveyance path for reversing the sheet and guides it to a position where the sheet faces a recording head, and a pair of conveyance rollers for conveying the sheet along the reversing conveyance path).

The postcard printing operation is a printing operation of recording an image on a postcard. That is, it is necessary that the MFP 10 capable of executing the postcard printing operation includes hardware for conveying the postcard (for example, a conveyance roller disposed at a position where the postcard can come into contact with a postcard-sized recording medium).

The display 23 is a liquid crystal display, an organic EL display or the like which includes a display surface to display various information.

The input I/F 24 is a user interface to accept user's input operations. In particular, the input I/F 24 has buttons and outputs to the CPU 31 various operation signals corresponding respectively to the pressed buttons. Further, the input I/F 24 may have a film-like touch sensor overlaid on the display surface of the display 23. The operation designating an object displayed on the display surface of the display 23 and the operation inputting character strings or number strings are an example of the operation. The term "object" refers to, for example, a character string, icon, button, link, radio button, check box, pull-down menu, or the like which is displayed on the display 23.

The input I/F 24 realized as a touch sensor outputs positional information indicating a position on the display surface touched by the user. Further, the term "touch" used in this specification includes all operations causing an input medium to contact with the display surface. Further, the above-described concept of "touch" may also include "hover" or "floating touch" which causes the input medium to approach such a position that the distance between the input medium and the display surface is extremely short, without the need for the input medium to contact with the display surface. Further, the input medium may refer to a finger of the user, a touch pen, or the like. The user's operation of tapping the position of an object displayed on the display 23 is an example of the operation for designating the object.

The communication I/F 25 is an interface for carrying out communications with external devices via the communication network 101. That is, the MFP 10 sends various information to the external device via the communication I/F 25 and receives various information from the external device via the communication I/F 25. While the communication I/F 25 is not limited particularly to any specific communication procedure, it is possible, for example, to adopt Wi-Fi (the registered trademark). In addition, when the MFP 10 and the portable terminal 50 are connected to each other by a USB cable, the communication I/F 25 may be a USB interface to which the USB cable can be detachably attached.

The CPU 31 controls the overall operation of the MFP 10. The CPU 31 acquires various programs (to be described below) from the memory 32 and executes based on various information output from the input I/F 24 and various information received from the external devices via the communication I/F 25. The CPU 31 and the memory 32 are configured as one example of a controller.

The memory 32 stores the OS 34 and the device program 35. The device program 35 may be a single program or an aggregate of a plurality of programs. Further, the memory 32 stores data or information necessary for executing the device program 35. The memory 32 is constituted by, for example, a RAM, a ROM, an EEPROM, an HDD, a portable storage medium such as a USB memory detachably attached to the MFP 10, a buffer provided in the CPU 31, or a combination thereof.

The memory 32 may be a computer-readable storage medium. A computer-readable storage medium is a non-transitory medium. A non-transitory medium includes other recording media such as a CD-ROM, DVD-ROM, or the like, in addition to the examples described above. Further, the non-transitory medium is also a tangible medium. On the other hand, while electrical signals carrying programs downloaded from a server or the like on the Internet are computer-readable signal media which are a sort of computer-readable media, but are not included in the non-transitory computer-readable storage media. The same applies to a memory 62 (to be described below) of the portable terminal 50.

The MIB (abbreviation of Management Information Base) of the memory 32 stores device information illustrated in FIG. 1. The device information includes a device ID for identifying the MFP 10 and function information for indicating whether the MFP 10 executes the specific operation. That is, the MFP 10A is identified by a device ID "MFP-A", wherein the double-sided printing operation and the postcard printing operation are executable, and the label printing operation is not executable. On the other hand, the MFP 10B is identified by a device ID "MFP-B", wherein the label printing operation and the postcard printing operation is executable, and the double-sided printing operation is not executable.

Figure 2B:
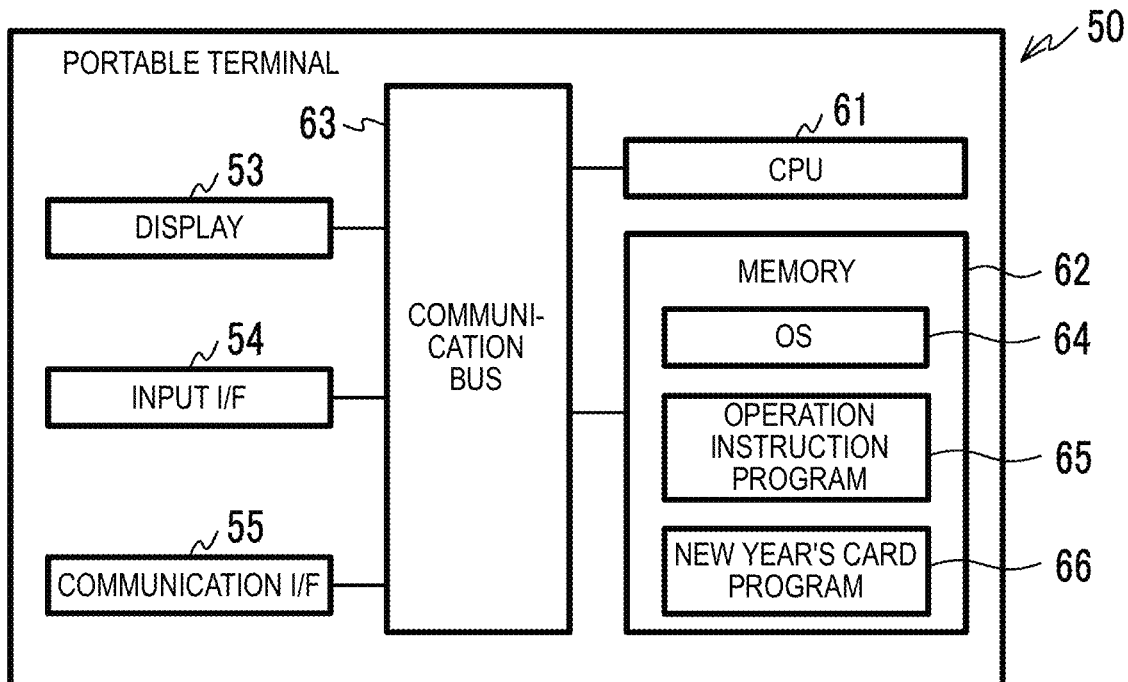
FIG. 2B is a block diagram of portable terminal.
Figure 4:
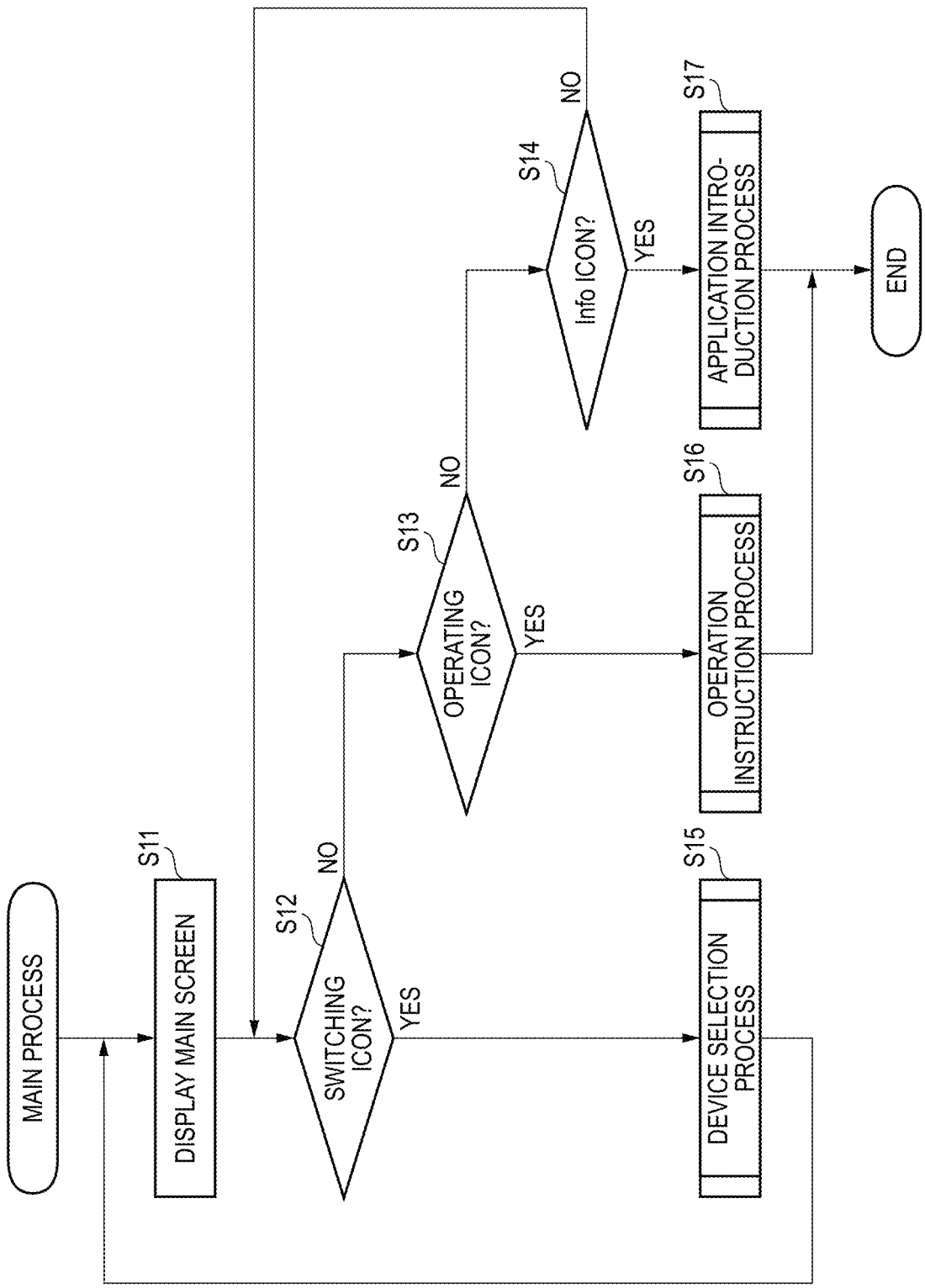
FIG. 4 is a flowchart of a main process.

The portable terminal 50 mainly has a display 53, an input I/F 54, a communication I/F 55, a CPU 61, a memory 62, and a communication bus 63 as illustrated in FIG. 2B. The display 53, the input I/F 54, the communication I/F 55, the CPU 61, the memory 62, and the communication bus 63 provided to the portable terminal 50 have substantially the same configuration of the display 23, the input I/F 24, the communication I/F 25, the CPU 31, the memory 32, and the communication bus 33, respectively, and description thereof will be omitted for brevity. It is noted that the CPU 61 and the memory 62 are examples of a controller.

The portable terminal 50 is, for example, a cellular phone, a smartphone, or a tablet terminal. Specifically, the display 53 of the portable terminal 50 preferably has a size of the display screen equal to or less than 12 inches, and more preferably, equal to or less than eight inches. Further, it is also preferable that the input I/F 54 of the portable terminal 50 is a touch sensor overlaid on the display screen of the display 53. The memory 62 stores an OS 64, an operation instruction program 65, and a new year's card program 66 which is an example of an external program.

The OS 64 may be, for example, Android (registered trademark) OS, iOS (registered trademark), or Windows Phone (registered trademark) Operating System. The OS 64 can execute a plurality of programs installed in the portable terminal 50 in parallel. The plurality of programs are virtually executed in parallel by a time division multiplex system, for example. In addition, the OS 64 executes one of the plurality of programs to be executed in parallel in the foreground, executes other programs in the background.

For example, the foreground is a state in which a screen based on the execution of the corresponding program is displayed in most of the display area of the display 53. The background is, for example, a state in which a screen based on the execution of a program different from the corresponding program is displayed in most of the display area of the display 53. That is, the portable terminal 50 can cause only the screen based on the execution of the program executed in the foreground to be displayed on the display 53, the program being one of the plurality of programs executed in parallel.

The operation instruction program 65 is a program that causes the MFP 10 connected via the communication I/F 55 to execute the image forming operation. More specifically, the operation instruction program 65 causes the user to designate the contents of the image forming operation (for example, the type of the image forming operation, image data to be subjected to the image forming operation, and execution conditions of the image forming operation) via the input I/F 54, and makes the MFP 10 execute the image forming operation of the designated contents. Further, the operation instruction program 65 can instruct the MFP 10 to perform the postcard printing operation, but cannot instruct the MFP 10 to perform the label printing operation and the double-sided printing operation.

Furthermore, the operation instruction program 65 can activate an external program installed in the portable terminal 50. For example, the operation instruction program 65 designates a program ID of the external program as an argument, and executes an API (hereinafter, referred to as "activation API") provided by the OS 64. In response to the execution of the activation API, the OS 64 activates the external program identified by the designated program ID. The operation instruction program 65 may activate the external program as a so-called plug-in, or may activate the external program using a shared function provided by the OS 64.

The new year's card program 66 is an external program causes the MFP 10 to execute the postcard printing operation of editing an image (hereinafter, referred to "communication-side image") to be recorded on a communication side of a postcard (typically, new year's card) according to an instruction of the user and recording the edited communication-side image on the communication side of the postcard. In addition, the new year's card program 66 can instruct the MFP 10 to perform the double-sided printing operation, but cannot instruct the MFP 10 to perform the label printing operation. Further, the new year's card program 66 includes more variations (for example, photographs, information of a sender, combination of arbitrary character strings onto a template image) of instructions for editing the communication-side image than the operation instruction program 65.

A specific example of the external program is not limited to the new year's card program 66. As another example of the external program, there may be a label program that causes the MFP 10 to execute a label printing operation of editing an image (hereinafter, referred to "label image") to be recorded on a surface of a CD-ROM or the like according to an instruction of the user and recording the edited label image on the CD-ROM or the like. As further another example of the external program, there may be a map program that causes the MFP 10 to execute a printing operation of receiving map image data indicating a map image of an area designated by the user from a server (not illustrated) on the Internet and targeting the received map image data.

As described above, the external program may be one in which a function not implemented in the operation instruction program 65 is implemented, a function implemented in the operation instruction program 65 can be easily realized, and the function implemented in the operation instruction program 65 is further detailed. Further, the external program is a program that is different from operation instruction program 65 and can be executed independently. That is, the external program is different from subroutines of the operation instruction program 65. In addition, the external program is a program that operates on the portable terminal 50, similarly to the operation instruction program 65.

Further, the external program may have a function of generating operation instruction information for instructing the execution of the image forming operation according to a predetermined protocol (for example, PS or PJL) and transmitting the generated operation instruction information to the MFP 10 via the communication I/F 55. Alternatively, the external program may request generation and transmission of the operation instruction information for another program (for example, a driver program) installed in the operation instruction program 65 or the portable terminal 50 and instruct indirectly the MFP 10 to perform the image forming operation through the program.

As illustrated in FIGS. 3A and 3B, the memory 62 can store designated device information. The designated device information is device information that is stored in the MIB of the MFP 10 (hereinafter, referred to "designated device" designated by the device selection process to be described below. The device ID included in the designated device information is an example of a designated device ID. The memory 62 can separately store first designated device information corresponding to the designated device designated through the new year's card program 66 and second designated device information corresponding to the designated device designated through the operation instruction program 65. That is, the first designated device information and the second designated device information may indicate the same MFP 10 or may indicate different MFPs 10.

In addition, the function information included in the designated device information differs depending on the program that causes the memory 62 to store the designated device information. As an example, as illustrated in FIG. 3A, the first designated device information stored by the new year's card program 66 includes function information corresponding to the double-sided printing operation and postcard printing operation that the new year's card program 66 can instruct the MFP 10, and does not include function information corresponding to the label printing operation that the new year's card program 66 cannot instruct the MFP 10. As another example, as illustrated in FIG. 3B, the second designated device information stored by the operation instruction program 65 includes function information corresponding to the postcard printing operation that the operation instruction program 65 can instruct the MFP 10, and does not include function information corresponding to the label printing operation and the double-sided printing operation that the operation instruction program 65 cannot instruct the MFP 10.

In addition, the memory 62 can store condition information as illustrated in FIGS. 3C and 3D, for example. The condition information is information indicating an execution condition of the image forming operation to be executed by the designated device. The memory 62 can separately store first condition information indicating an execution condition designated through the new year's card program 66 and second condition information indicating an execution condition designated through the operation instruction program 65. That is, the first condition information and the second condition information may indicate the same execution condition, or may indicate different execution conditions. FIGS. 3C and 3D illustrate condition information of the printing operation, but condition information of the scanning operation or the like may be additionally stored in the memory 62.

Although not illustrated in the drawings, a data folder may be provided in the memory 62. The data folder may store, for example, photograph data, document data, presentation data, and spreadsheet data. Various types of data stored in the data folder are data which can be subjected to the printing operation.

Operation of System 100

An operation of the system 100 according to the embodiment will be described with reference to FIGS. 4 to 8. At the time of starting a main process in FIG. 4, it is assumed that the memory 62 stores the first designated device information illustrated in FIG. 3A, the first condition information illustrated in FIG. 3C, and the second condition information illustrated in FIG. 3D, but does not store the second designated device information.

Flowcharts described in the present specification basically indicate processes of the CPUs 31 and 61, respectively, each in accordance with an instruction described in a program. Namely, the processes such as "determining", "extracting", "selecting", "calculating", "specifying", "controlling", etc., in the following explanation represent the processes of the CPUs 31 and 61. The processes by the CPUs 31 and 61 also include hardware controls via the OS 34 and OS 64, respectively. Further, the term "data" in the present specification is represented by a bit sequence which is readable by a computer. Furthermore, a plurality of pieces of data of which substantive meanings and contents are same but are different in format thereof are handled as a same data. This also applies similarly to the term "information" in the present specification.

First, the OS 64 of the portable terminal 50 causes the display 53 to display a menu screen illustrated in FIG. 9A. The menu screen includes program icons 111, 112, 113, and 114 corresponding to programs installed in the portable terminal 50. The program icon 111 corresponds to the operation instruction program 65, the program icon 112 corresponds to the new year's card program 66, the program icon 113 corresponds to the label program, and the program icon 114 corresponds to the map program. Then, the OS 64 accepts an operation on the menu screen through the input I/F 54.

As an example, the OS 64 activates the new year's card program 66 in response to the designation of the program icon 112 through the input I/F 54 and executes the new year's card program 66 in the foreground. The new year's card program 66 executes a communication side editing process illustrated in FIG. 6 in response to the activation by the OS 64 resulting from the operation of tapping the program icon 112. Details of the communication side editing process will be described below.

As another example, the OS 64 activates operation instruction program 65 in response to the designation of the program icon 111 through the input I/F 54, and executes the operation instruction program 65 in the foreground. The operation instruction program 65 executes the main process illustrated in FIG. 4, in response to the activation by the OS 64 resulting from the operation of tapping the program icon 111.

Operation of Operation Instruction Program 65

First, the operation instruction program 65 causes the display 53 to display a main screen illustrated in FIG. 9B (S11). The main screen includes operating icons 121 and 122, a switching icon 124, and an "Info" icon 125. The operating icon 121 corresponding to an execution instruction of the printing operation, the operating icon 122 corresponds to an execution instruction of the scanning operation. The switching icon 124 corresponds to a switching instruction of the designated device. When the second designated device information is not stored in the memory 62, a character string "non-selective" indicating that the designated device is not selected is described in the switching icon 124. The "Info" icon 125 corresponds to a display instruction of an application introduction screen to be described below. Then, the operation instruction program 65 accepts the operation on the main screen through the input I/F 54 (S12 to S14).

Next, in response to accepting the designation of the switching icon 124 through the input I/F 54 (S12: Yes), for example, the operation instruction program 65 executes the device selection process (S15). The device selection process is a process of switching the designated device according to a user's instruction. With reference to FIG. 5A, details of the device selection process will be described.

First, the operation instruction program 65 searches for a plurality of MFPs 10 capable of communicating through the communication I/F 55 using, for example, SNMP (abbreviation of Simple Network Management Protocol) (S21). Specifically, the operation instruction program 65 broadcasts transmission request information to the communication network 101 through the communication I/F 55. Next, in response to the transmission request information, the operation instruction program 65 receives the device ID transmitted from the MFPs 10A and 10B through the communication I/F 55. That is, the operation instruction program 65 specifies the MFPS 10A and 10B which are transmission sources of the device ID, as the communicable MFP 10. It should be noted that the method of searching the communicable MFP 10 may be another well-known method.

Figure 10A:
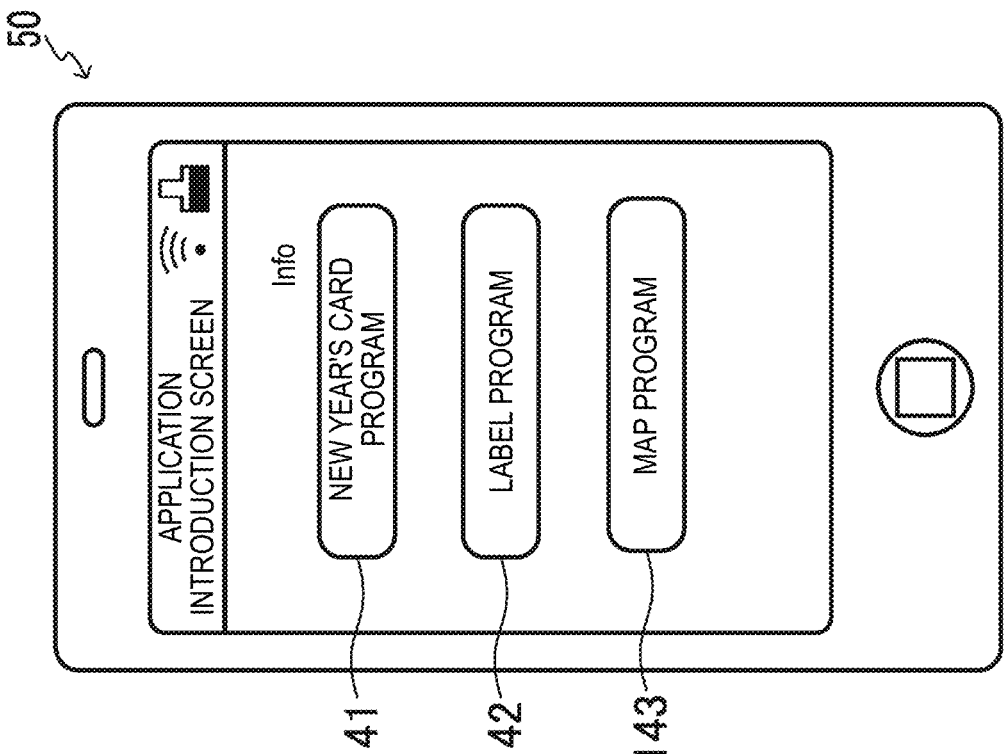
FIG. 10A is an example of a device selection screen displayed on the display.

Next, the operation instruction program 65 causes the display 53 to display a device selection screen illustrated in FIG. 10A (S22). The device selection screen includes device icons 131 and 132 corresponding to the MFP 10A and 10B searched in S21. Then, the operation instruction program 65 accepts the operation on the device selection screen through the input I/F 54 (S23). The process of S23 is an example of a first acceptance process.

Next, in response to accepting the designation of the device icon 132 through the input I/F 54 (S23: Yes), for example, the operation instruction program 65 transmits function request information for requesting transmission of the function information corresponding to the postcard printing operation the MFP 10B corresponding to the device icon 132 through the communication I/F 55. Next, in response to the function request information, the operation instruction program 65 receives function information "possible" corresponding to the postcard printing operation through the communication I/F 55 from the MFP 10B. The procedure for receiving the function information from the MFP 10 is the same as in S44 to be described below.

Then, as illustrated in FIG. 3B, the operation instruction program 65 causes the memory 62 to store the second designated device information including the device ID "MFP-B" received from the MFP 10B and the function information "possible" corresponding to the postcard printing operation (S24). When the second designated device information is already stored in the memory 62, the operation instruction program 65 overwrites the second designated device information with new second designated device information.

Subsequently, returning to FIG. 4, the operation instruction program 65 causes the display 53 to display the main screen (S11). On the main screen after the device icon 132 is designated, the switching icon 124 describes the device ID "MFP-B" of the second designated device information. Next, in response to accepting the designation of the operating icons 121 and 122 through the input I/F 54 (S13: Yes), for example, the operation instruction program 65 executes an operation instruction process for causing the designated device to execute the image forming operation associated with the operating icons 121 and 122 (S16). Although illustration of the operation instruction process is not presented, for example, the following process is executed.

As an example, when the operating icon 121 is tapped, the operation instruction program 65 accepts an operation for designating one of the plurality of data stored in the data folder of the memory 62 as designation data, through the input I/F 54. Further, in response to accepting the operation for changing the parameter included in the second condition information through the input I/F 54, the operation instruction program 65 overwrites the second condition information with the changed parameter. The process of accepting the tap of the operating icon 121, the designation of the designation data, and the change of the second condition information are an example of the second acceptance process of accepting the operation for specifying the content of the printing operation.

Then, the operation instruction program 65 transmits print instruction information to the MFP 10B, which is the designated device, through the communication I/F 55. The print instruction information is an example of the operation instruction information for executing a printing operation targeting the designation data according to the execution condition indicated by the second condition information. The print instruction information includes, for example, the designation data and the second condition information.

On the other hand, the device program 35 of the MFP 10B receives the print instruction information from the portable terminal 50 through the communication I/F 25. Then, the device program 35 causes the printer 11 to execute the printing operation according to the received print instruction information. That is, the printer 11 records the image indicated by the designation data included in the print instruction information on the sheet, according to the execution condition indicated by the second condition information included in the print instruction information.

As another example, when the operating icon 122 is tapped, the operation instruction program 65 accepts an operation for designating the execution condition of the scanning operation and an operation for designating a storage destination of the scan data generated by the scanning operation, through the input I/F 54. Then, the operation instruction program 65 transmits scan instruction information to the MFP 10B, which is the designated device, through the communication I/F 55. The scan instruction information is an example of the operation instruction information for executing the scanning operation according to the designated execution conditions and executing a series of process of storing the scan data generated by the scanning operation in the designated storage destination.

On the other hand, the device program 35 of the MFP 10B receives the scan instruction information from the portable terminal 50 through the communication I/F 25. Then, the device program 35 causes the scanner 12 to execute the scanning operation according to the received scan instruction information. That is, the scanner 12 reads an image recorded on a contact glass or a document set in an ADF according to the designated execution conditions and generates scan data. Then, the scanner 12 stores the generated scan data in the designated storage destination.

If the second designated device information is stored in the memory 62 in the device selection process executed previously, the operation instruction program 65 can execute the operation instruction process without executing the device selection process thereafter. That is, the operation instruction program 65 can cause the designated device indicated by the second designated device information to be used as a default device and to repeatedly execute the image forming operation.

In response to accepting the designation of the "Info" icon 125 through the input I/F 54 (S14: Yes), the operation instruction program 65 executes the application introduction process (S17). The application introduction process is a process of introducing an external program capable of activating the operation instruction program 65 to the user and activating the external program designated by the user. With reference to FIG. 5B, details of the application introduction process will be described.

Figure 10B:
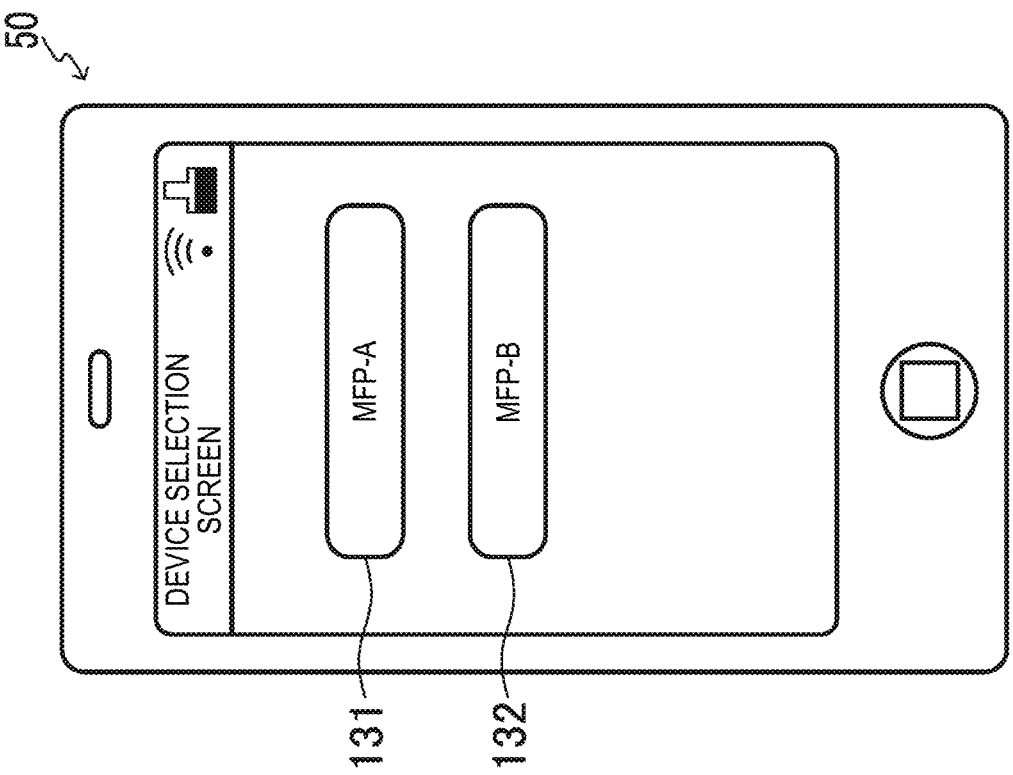
FIG. 10B is an example of an application introduction screen displayed on the display.

First, the operation instruction program 65 causes the display 53 to display the application introduction screen illustrated in FIG. 10B (S31). The application introduction screen includes application icons 141, 142, and 143 corresponding to the external program capable of activating the operation instruction program 65. The application icon 141 corresponds to the new year's card program 66, the application icon 142 corresponds to the label program, and the application icon 143 corresponds to the map program. Then, the operation instruction program 65 accepts an operation on the application introduction screen through the input I/F 54 (S32). The process of S32 is an example of a third acceptance process.

Next, in response to accepting the designation of the application icon 141 through the input I/F 54 (S32: Yes), for example, the operation instruction program 65 determines whether the new year's card program 66 (hereinafter, may be referred to as "target application") corresponding to the designated application icon 141 is installed in the portable terminal 50 (S33). For example, the operation instruction program 65 may execute an inquiry API provided by the OS 64 API and acquire installation information indicating the presence or absence of the target application as a return value of the inquiry API.

Then, in response to determining that the new year's card program 66 is installed (S33: Yes), the operation instruction program 65 activates the new year's card program 66 and delivers the second designated device information and the second condition information stored in the memory 62 to the new year's card program 66 (S34). The process of S34 is an example of an activation process. For example, the operation instruction program 65 may execute the activation API by designating the program ID of the new year's card program 66, the second designated device information, and the second condition information as arguments. Then, the OS 64 activates the new year's card program 66 while switching the operation instruction program 65 in the background, and executes the new year's card program 66 in the foreground.

As another example, the operation instruction program 65 may cause the second designated device information and the second condition information to be stored in a specific area of the memory 62, specify the program ID of the new year's card program 66 as an argument, and execute the activation API. The specific area is, for example, an area of the memory 62 that the new year's card program 66 accesses at the time of activation. That is, the operation instruction program 65 may deliver the second designated device information and the second condition information to the new year's card program 66 through the specific area of the memory 62. On the other hand, the operation instruction program 65 may not deliver the second designated device information and the second condition information when activating the target application as a plug-in.

Meanwhile, in response to determining that the new year's card program 66 is not installed (S33: No), the operation instruction program 65 installs the new year's card program 66 (S35). More specifically, the operation instruction program 65 may designate the program ID of the new year's card program 66 as an argument, and activate an installer (not illustrated). The installer activated by the operation instruction program 65 downloads the new year's card program 66 identified by the program ID acquired as an argument, from a server, for example, and causes the downloaded new year's card program 66 to be stored in a predetermined area of the memory 62.

Operation of New Year's Card Program 66

Figure 6:
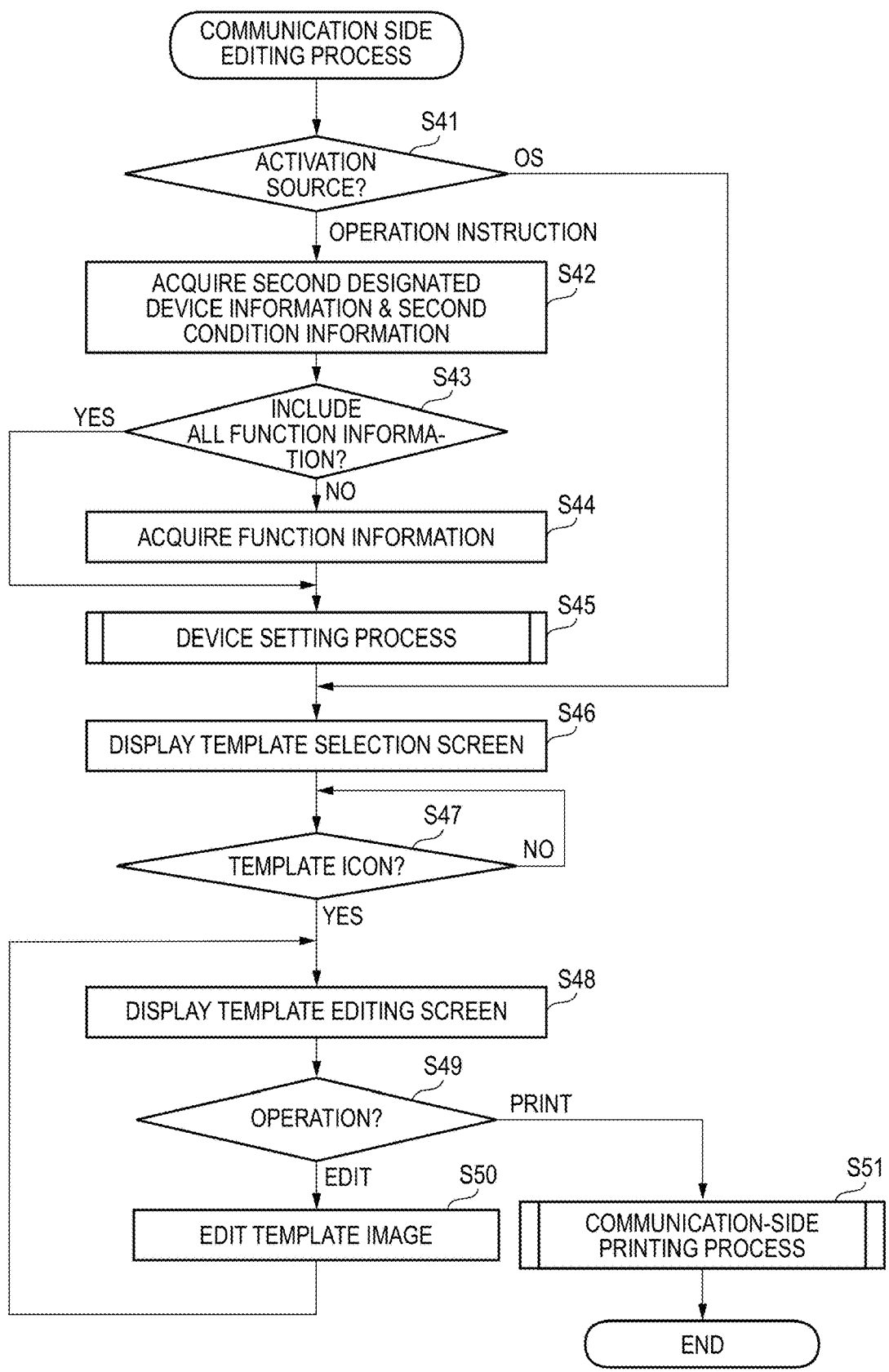
FIG. 6 is a flowchart of a communication side editing process.

In response to the activation by the OS 64 due to the operation of tapping the program icon 112 or the activation by the activation API executed by the operation instruction program 65, the new year's card program 66 executes the communication side editing process illustrated in FIG. 6. The new year's card program 66 can acquire, for example, activation information indicating how it is activated, as an activation argument. First, the new year's card program 66 determines a program of an activation source based on the activation information acquired as the activation argument (S41).

Next, in response to the determination that the new year's card program 66 has been activated by the OS 64 due to the operation of tapping the program icon 112 (S41: OS), processes of S42 to S45 are skipped and a template selection screen (not illustrated) is displayed on the display 53 (S46). The template selection screen is a screen for allowing the user to select template image data to be recorded on the communication side of the postcard. The template selection screen includes, for example, template icons corresponding respectively to the plurality of template image data. Then, the new year's card program 66 accepts the operation on the template selection screen through the input I/F 54 (S47).

Next, in response to accepting the designation of one of the plurality of template icons through the input I/F 54 (S47: Yes), the new year's card program 66 acquires the template image data corresponding to the designated template icon from the memory 62 or a server (not illustrated) on the Internet. The process of S47 is an example of the second acceptance process.

Next, the new year's card program 66 causes the display 53 to display a template editing screen illustrated in FIG. 11A (S48). The template editing screen includes a template image 151, an area indication image 152, a font icon 153, a stamp icon 154, a "save" icon 155, and a "print" icon 156. Then, the new year's card program 66 accepts the operation on the template editing screen through the input I/F 54 (S49).

The template image 151 is an image indicated by the template image data acquired in S47. The area indication image 152 is a frame type image indicating an area reserved for combining a sender image representing a sender of a postcard on the template image 151. The font icon 153 corresponds to an instruction to switch a font type (for example, Gothic type or Mincho type) of characters included in the template image 151. The stamp icon 154 corresponds to an instruction to select a stamp to be combined with the template image 151.

As an example, in response to accepting the designation of the area indication image 152 through the input I/F 54 (S49: edit), the new year's card program 66 combines the sender image indicating the sender designated through the input I/F 54 with the template image 151 instead of the area indication image 152 (S50). As another example, in response to accepting the designation of the stamp icon 154 through the input I/F 54 (S49: edit), the new year's card program 66 combines the stamp image designated through the input I/F 54 into the template image 151 (S50). As further another example, in response to accepting the designation of the front icon 153 through the input I/F 54 (S49: edit), the new year's card program 66 converts the characters included in the template image 151 into the font type designated through the input I/F 54 (S50).

Then, the new year's card program 66 causes the display 53 to display the template editing screen including the edited template image 151 (S48). Then, by repetitive execution of the processes S48 to S50, for example, as illustrated in FIG. 11B, a sender image indicating a sender's address "Nagoya city α-ward" and a name "Patent Taro" and a rooster-symbol stamp image are combined with the template image 151. A process of accepting the operation for instructing the combination of the sender image, the combination of the stamp image, and the conversion of the font type is an example of the second acceptance process.

Figure 7:
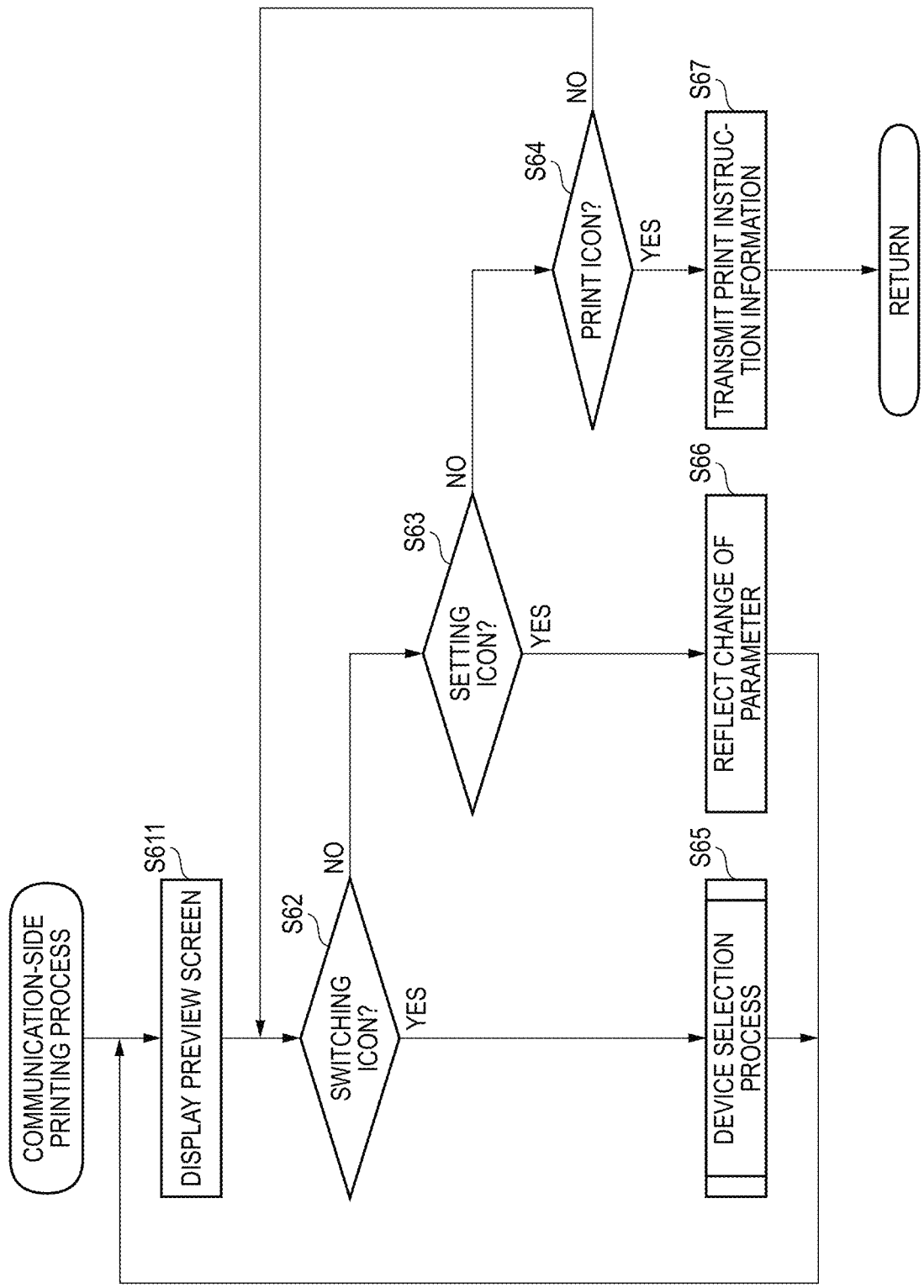
FIG. 7 is a flowchart of a communication side printing process.

Further, in response to accepting the designation of the "print" icon 156 through the input I/F 54 (S49: print), the new year's card program 66 executes a communication-side printing process (S51). Although not illustrated, in response to accepting the designation of the "save" icon 155 through the input I/F 54, the new year's card program 66 causes the template image data indicating the edited template image 151 to be stored in a predetermined area of the memory 62. The communication-side printing process is a process of instructing the designated device to execute the postcard printing operation targeting the template image 151 generated in S46 to S50. With reference to FIG. 7, details of the communication-side printing process will be described.

First, the new year's card program 66 causes the display 53 to display a preview screen illustrated in FIG. 11B (S61). The preview screen includes a preview image 161, a switching icon 162, a "setting" icon 163, and a "print" icon 164. The preview image 161 indicates a state in which the template image 151 generated in S46 to S50 is recorded on the postcard. The switching icon 162 corresponds to a switching instruction of the designated device. The "setting" icon 163 corresponds to a switching instruction of the first condition information. The "print" icon 164 corresponds to an execution instruction of the postcard printing operation. Then, the new year's card program 66 accepts the operation on the preview screen through the input I/F 54 (S62~S64).

Next, in response to accepting the designation of the switching icon 162 through the input I/F 54 (S62: Yes), for example, the new year's card program 66 executes the device selection process illustrated in FIG. 5A (S65). Hereinafter, common points with the device selection process executed by the operation instruction program 65 will not be described, and processes peculiar to the new year's card program 66 will be mainly described.

First, the new year's card program 66 may search all the MFPs 10 that can communicate through the communication I/F 55 in S21, or may search only the MFP 10 executable all the specific operations that can be instructed by the that new year's card program 66. In response to accepting the designation of the device icon 131 through the input I/F 54 (S23: Yes), for example, the new year's card program 66 receives the function information corresponding to the double-sided printing operation and the postcard printing operation from the MFP 10A corresponding to the device icon 131.

Further, the new year's card program 66 causes the memory 62 to store the device ID received from the MFP 10A and the first designated device information including the function information (S24). In the device selection process to be executed by the new year's card program 66, the device ID "MFP-A" of the MFP 10A corresponding to the device icon 131 designated in S23 is an example of the first device ID. The process S24 executed by the new year's card program 66 is an example of a first storage process. Then, returning to FIG. 7, the new year's card program 66 causes the display 53 to display the preview screen (S61). In the switching icon 162 of the preview screen displayed herein, the device ID of the first designated device information stored in the memory 62 in the latest process S24 is described.

In response to accepting the designation of the "setting" icon 163 through the input I/F 54 (S63: Yes), the new year's card program 66 accepts the operation for changing the parameter included in the first condition information, through the input I/F 54. Then, the new year's card program 66 causes the parameter changed through the input I/F 54 to reflect on the first condition information stored in the memory 62 (S66). The new year's card program 66 may not accept the change of the parameter "postcard" of the item "size". The process of accepting the operation for changing the parameter of the first condition information is an example of the second acceptance process. Then, the new year's card program 66 causes the display 53 to display the preview screen (S61).

Further, in response to accepting the designation of the "print" icon 164 through the input I/F 54 (S64: Yes), the new year's card program 66 transmits the print instruction information to the MFP 10A, which is the designated device, through the communication I/F 55 (S67). The print instruction information includes the template image data generated in S46 to S50 and the first condition information. The process S67 is an example of the operation instruction process. The process of the MFP 10A, which has received the print instruction information, is the same as that in S16.

The new year's card program 66 may further accept an operation for designating a postcard's destination, through the input I/F 54. Next, the new year's card program 66 may generate destination image data indicating a name and an address of the designated destination. In S67, then, the new year's card program 66 may transmit the print instruction information indicating the double-sided printing operation, in which the destination image indicated by the generated destination image data is recorded on the address side of the postcard and the edited template image is recorded on the communication side, to the MFP 10A through the communication I/F 55.

Returning to FIG. 6, in response to determining that the new year's card program 66 has been activated by the activation API executed by the operation instruction program 65 (S41: operation instruction), the new year's card program 66 acquires the second designated device information and the second condition information delivered from the operation instruction program 65 (S42). That is, the new year's card program 66 may acquire the second designated device information and the second condition information designated as the arguments of the activation API and may read the second designated device information and the second condition information stored in the specific area. The process S42 is an example of an acquisition process.

Next, the new year's card program 66 determines whether the second designated device information acquired in S42 includes the function information corresponding to all the specific operations (that is, the double-sided printing operation and the postcard printing operation) that the new year's card program 66 can instruct the MFP 10 (S43). Then, in response to determining that the second designated device information does not include the function information corresponding to the double-sided printing operation (S43: No), the new year's card program 66 receives function information "impossible" corresponding to the double-sided printing operation from the MFP 10B identified by the device ID "MFP-B" of the second designated device information (S44). Then, the new year's card program 66 adds the function information corresponding to the double-sided printing operation received in S44 to the second designated device information acquired in S42. On the other hand, in response to determining that the second designated device information includes all the function information (S43: Yes), the new year's card program 66 skips the process S44. The process S43 is an example of a third determination process, and the process S44 is an example of a reception process.

Figure 8:
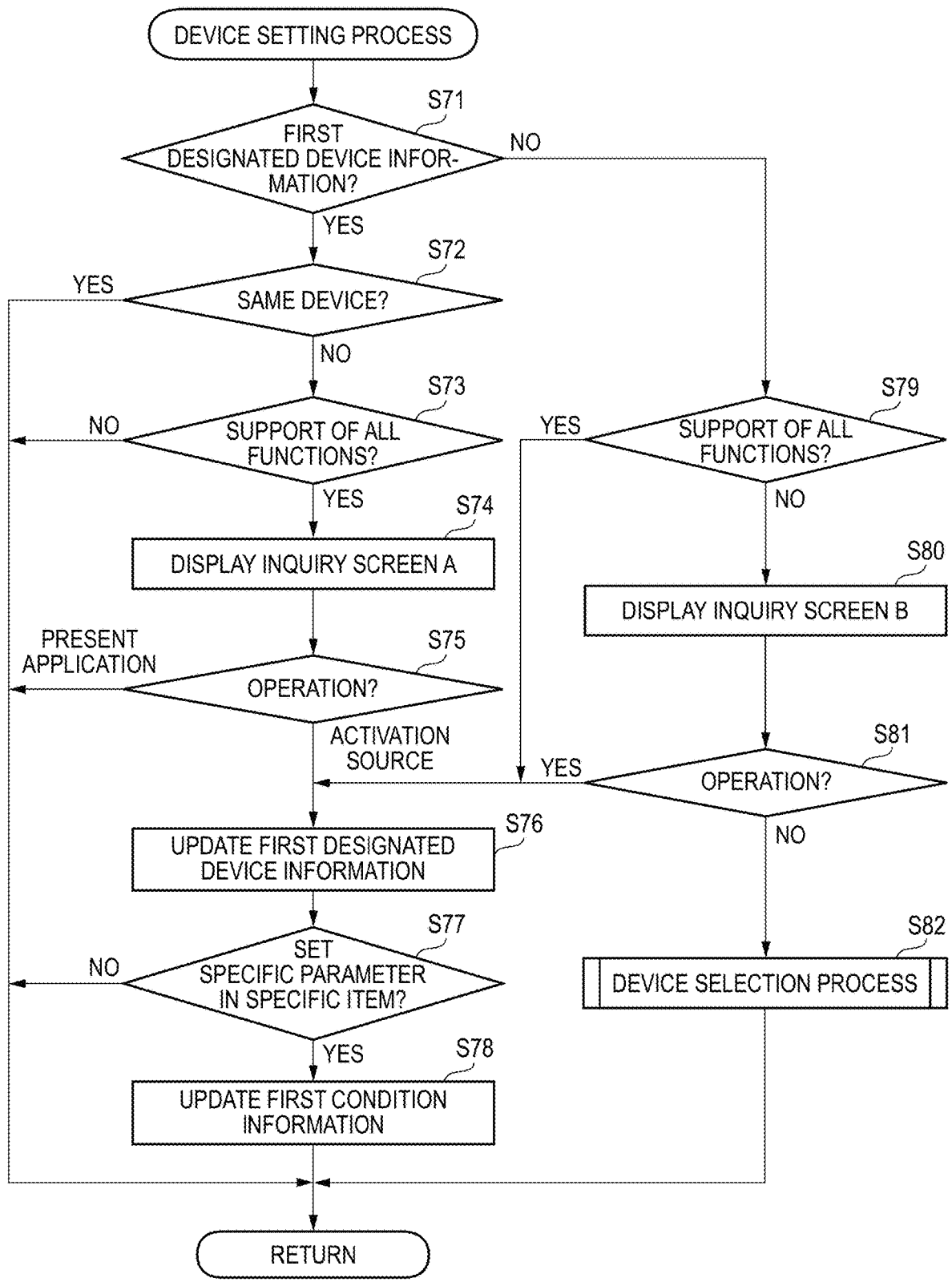
FIG. 8 is a flowchart of a device setting process.

Next, the new year's card program 66 executes the device setting process (S45). The device setting process is a process of updating the first designated device information and the first condition information stored previously in the memory 62 by the new year's card program 66 with the second designated device information and the second condition information acquired from the operation instruction program 65 in S42, as necessary. With reference to FIG. 8, details of the device setting process will be described.

First, the new year's card program 66 determines whether the first designated device information is stored in the memory 62 (S71). In addition, the new year's card program 66 determines whether the device ID "MFP-A" of the first designated device information stored in the memory 62 matches the device ID "MFP-B" of the second designated device information acquired in S42 (S72). The device ID "MFP-B" of the second designated device information is an example of the second device ID. The processes S71 and S72 are examples of first determination processes.

Next, in response to determining that the first designated device information is stored in the memory 62 and the first designated device information is different in device ID from the second designated device information (S71: Yes & S72: No), The new year's card program 66 determines whether the MFP 10B identified by the device ID "MFP-B" of the second designated device information can execute all the specific operations (that is, the double-sided printing operation and the postcard printing operation), which can be instructed by the new year's card program 66, based on the function information of the second designated device information (S73). The process S73 is an example of a second determination process.

In the embodiment, since the MFP 10B cannot execute the double-sided printing operation out of the double-sided printing operation and the postcard printing operation (S73: No), the new year's card program 66 skips processes S74 to S78 and finishes the device setting process. In response to determining that the first designated device information is stored in the memory 62 and the device ID of the first designated device information matches the device ID of the second designated device information (S71: Yes & S72: Yes), the new year's card program 66 skips the processes S73 to S78 and finishes the device setting process.

On the other hand, assuming that the MFP 10B is capable of executing both the double-sided printing operation and the postcard printing operation (S73: Yes), the new year's card program 66 causes the display 53 to display an inquiry screen A illustrated in FIG. 12A (S74). Then, the new year's card program 66 accepts an operation on the inquiry screen A through the input I/F 54 (S75). The process S75 is an example of a third acceptance process.

The inquiry screen A is a screen for allowing the user to select which one of the first designated device information and the second designated device information is to be used. The inquiry screen A includes a message "which application do you select to use the designated MFP?", an "activation source" icon 171, and a "present application" icon 172. The "activation source" icon 171 corresponds to the second designated device information, and the device ID "MFP-B" of the second designated device information is described. The "present application" icon 172 corresponds to the first designated device information, and the device ID "MFP-A" of the first designated device information is described.

Next, in response to accepting the designation of the "activation source" icon 171 through the input I/F 54 (S75: activation source), the new year's card program 66 causes the memory 62 to store the second designated device information, which is acquired from the operation instruction program 65 in S42 and is added with the function information corresponding to the double-sided printing operation in S44, as the first designated device information (S76). That is, the first designated device information stored already in the memory 62 is overwritten. The designation of the "activation source" icon 171 is an example of a first operation. The process S76 is an example of a second storage process.

Next, the new year's card program 66 determines whether the parameter "postcard" is set in the item "size" of the second condition information acquired in S42 (S77). Then, in response to determining that the parameter "postcard" is set in the item "size" of the second condition information (S77: Yes), the new year's card program 66 causes the memory 62 to store the parameter "glossy paper of the item "paper type" of the second condition information, as a parameter of the item "paper type" of the first condition information (S78). That is, the parameter of the item "paper type" of the first condition information stored already in the memory 62 is overwritten. On the other hand, the new year's card program 66 does not overwrite the parameter of the item "color" in S78. The process S77 is an example of a fourth determination process, and the process S78 is an example of a third storage process.

The parameter "postcard" of the item "size" is a parameter which should not be changed when the new year's card program 66 causes the designated device to execute the postcard printing operation. On the other hand, the item "paper type" is an item by which the user can select arbitrary parameters when the new year's card program 66 causes the designated device to execute the postcard printing operation. The item "size" is an example of a specific item, the parameter "postcard" is an example of a specific parameter, and the item "paper type" is an example of a target item. The specific item, the specific parameter, and the target item are predetermined for each external program and are defined in a source code of the external program or a setting file. That is, the specific item, the specific parameter, and the target item may be different for each external program. In addition, a plurality of specific items, specific parameters, and target items may be used.

Meanwhile, in response to determining that the parameter "postcard" is not set in the item "size" of the second condition information (S77: No), the new year's card program 66 skips the process S78 and finishes the device setting process. In response to accepting the designation of the "present application" icon 172 through the input I/F 54 (S75: present application), the new year's card program 66 skips the processes S76 to S78 and finishes the device setting process. The designation of the "present application" icon 172 is an example of a second operation.

Further, in response to determining that the second designated device information is not stored in the memory 62 (S71: No), the new year's card program 66 determines whether the MFP 10B identified by the device ID "MFP-B" of the second designated device information can execute all the specific operations (that is, the double-sided printing operation and the postcard printing operation), which can be instructed by the new year's card program 66, based on the function information of the second designated device information (S79). The process S79 is an example of the second determination process and may be the same as the process S73.

Next, in response to determining that the MFP 10B cannot execute the double-sided printing operation out of the double-sided printing operation and the postcard printing operation (S79: No), the new year's card program 66 causes the display 53 to display an inquiry screen B illustrated in FIG. 12B (S80). Then, the new year's card program 66 accepts an operation on the inquiry screen B through the input I/F 54 (S81). The process S81 is an example of a fourth acceptance process.

The inquiry screen B is a screen for allowing the user to select whether to use the second designated device information or to cause the new year's card program 66 to execute the device selection process. The inquiry screen B includes a message [Do you select an activation source application to use the designated "MFP-B"?], a "YES" icon 181, and a "NO" icon 182. The "MFP-B" included in the message corresponds to the device ID of the second designated device information. The "YES" icon 181 corresponds to using the second designated device information. The "NO" icon 182 corresponds to causing the new year's card program 66 to execute the device selection process.

Then, in response to accepting the designation of the "YES" icon 181 through the input I/F 54 (S81: Yes), the new year's card program 66 executes processes subsequent to the process S76. On the other hand, in response to accepting the designation of the "NO" icon 182 through the input I/F 54 (S82: NO), the new year's card program 66 executes the device selection process instead of the processes S76 to S78 (S82). The designation of the "YES" icon 181 is an example of a third operation, and the designation of the "NO" icon 182 is an example of a fourth operation. Furthermore, assuming that the MFP 10B is capable of executing both the double-sided printing operation and the postcard printing operation (S79: Yes), the new year's card program 66 skips the processes S80 and S81, and executes processes subsequent to the process S76.

Returning now to FIG. 6, the new year's card program 66 executes the processes subsequent to the process S46 described above. That is, when the process S76 is executed, the new year's card program 66 causes the designated device designated by the user through the operation instruction program 65 to execute the printing operation (S67). On the other hand, when the process S76 is not executed, the new year's card program 66 causes the designated device designated previously by the user through the new year's card program 66 or the designated device newly designated by the user in S82 to execute the printing operation (S67). Furthermore, the new year's card program 66 can further execute the device selection process in S65 after executing the device setting process.

That is, when causing the memory 62 to store the first designated device information in S65, S76, and S82 which are previously executed, the new year's card program 66 can execute the operation instruction process without executing the processes S65, S76, and S82 thereafter. That is, the new year's card program 66 can cause the designated device, which is indicated by the first designated device information and is used as a default device, to repeatedly execute the image forming operation.

Operational Effects of the Embodiment

Since the new year's card program 66 according to the embodiment causes the memory 62 to stores the second designated device information acquired from the operation instruction program 65 as the first designated device information when being activated by the operation instruction program 65 installed in the portable terminal 50, the device selection process S65 can be skipped. That is, when the user of the portable terminal 50 designates the designated device through the operation instruction program 65, it is necessary to designate the designated device again through the new year's card program 66, and thus the operation for designating the designated device is simplified.

According to the embodiment, when the designated device is previously designated through the new year's card program 66, the user can select one of the designated device designated through the operation instruction program 65 and the designated device designated previously through the new year's card program 66, through the inquiry screen A. Thus, it is possible to cause a desired designated device to execute the image forming operation with a simple operation.

According to the embodiment, when all the specific operations supported by the new year's card program 66 can be executed by the designated device designated through the operation instruction program 65, the inquiry screen A is displayed. That is, when the "activation source" icon 171 on the inquiry screen A is tapped, the designated device indicated by the second designated device information overwritten in S76 can execute all the specific operations which can be instructed by the new year's card program 66. Thus, it is possible to effectively utilize the functions implemented in the new year's card program 66.

According to the embodiment, when the designated device is not previously designated through the new year's card program 66, the user can select whether to use the designated device designated through the operation instruction program 65 or whether to designate newly the designated device through the new year's card program 66, through the inquiry screen B. Thus, it is possible to cause a desired designated device to execute the image forming operation with a simple operation.

According to the embodiment, when only some of the specific operations supported by the new year's card program 66 can be executed by the designated device designated through the operation instruction program 65, the inquiry screen B is displayed. That is, for example, the user may tap the "YES" icon 181 to instruct the image forming operation executable by the designated device on the inquiry screen B through the new year's card program 66, or may tap the "NO" icon 182 to instruct the specific operation not executable by the designated device on the inquiry screen B. On the other hand, when all the specific operations supported by the new year's card program 66 can be executed by the designated device designated through the operation instruction program 65, the processes S80 and S81 are skipped, and thus the operation is simplified.

According to the embodiment, when the parameter "postcard" of the item "size" is included in the second condition information, the first condition information is overwritten with the second condition information. The case where the parameter "postcard" of the item "size" is included in the second condition information is considered to be a case where an attempt is made to instruct the designated device to execute the postcard printing operation through the operation instruction program 65. Therefore, there is a high possibility that parameters suitable for the postcard printing operation are also set with respect to the other items "paper type" and "color" of the second condition information. Accordingly, when the process S78 is executed in such a case, it is possible to simplify not only the operation for designating the designated device but also the operation for designating the execution conditions. However, the parameters of all items may be overwritten in S78. In addition, the process S78 may be executed regardless of whether the second condition information includes a specific parameter of a specific item.

In the MFP 10 and the portable terminal 50 of the above embodiment, there has been described an example in which various programs stored in the memories 32 and 62 are executed by CPUs 31 and 61, whereby each processing that the controller of this disclosure executes is realized. However, the configuration of the controller is not limited thereto, some or all of them may be realized by hardware such as an integrated circuit.

This disclosure may be realized not only as the MFP 10 and the portable terminal 50 but also as a program of causing the MFP 10 and the portable terminal 50 to execute the processes. The program may be provided by being recorded in non-transitory recording medium. The non-transitory recording medium may include a CD-ROM, a DVD-ROM, and a storage mounted in a server which can be connected to the MFP 10 and the portable terminal 50 through the communication network 101. The program stored in the storage of the server may be distributed through a communication network 101 such as the Internet in the form of information or signal indicating the program.

What is claimed is:

1. A non-transitory computer-readable medium storing first program instructions to control a terminal device including a display, an input interface, and a memory storing second program instructions different from the first program instructions, the first program instructions and the second program instructions being executable by a computer of the terminal device, the first program instructions, when executed from the second program instructions in response to accepting an operation designating the first program instructions in a screen of the second program instructions through the input interface, causing the terminal device to perform:

acquiring a device ID for identifying an image processing device designated by the second program instructions, from the second program instructions; and displaying, an information about the image processing device identified by the device ID, on the display.

2. The non-transitory computer-readable medium storing the first program instructions according to claim 1, wherein the memory stores an operating system, the operating system being configured to display a plurality of images representing a plurality of programs, on the display, the first program instructions further causes the terminal device to perform:

accepting an operation, though the input interface, designating one of the plurality of images representing the image processing device, respectively;

storing a designated device ID for identifying the designated image processing device in the memory; and displaying, when executed in response to the accepting the operation designating the image representing the first program instructions through the input interface, an information representing the designated device ID.

3. The non-transitory computer-readable medium storing the first program instructions according to claim 2, the first program instructions further causing the terminal device to perform:

determining whether the first program instructions is activated by the operating system or activated by the second program instructions.

4. The non-transitory computer-readable medium storing the first program instructions according to claim 3, the first program instructions further causing the terminal device to perform:

storing a first device ID for identifying a first image processing device designated by the accepting, as the designated device ID; and acquiring, when it is determined that the first program instructions is activated by the second program instructions, from the second program instructions, a second device ID, which is designated in the second program instructions through the input interface, for identifying a second image processing device, wherein the first program instructions, after performing one of the storing and the acquiring, further causes the terminal device to perform:

accepting an operation designating contents of an image processing through the input interface; and transmitting processing instruction information for causing the image processing having the designated content to be performed to one of the first image processing device and the second image processing device.

5. The non-transitory computer-readable medium storing the first program instructions according to claim 4, the first program instructions further causing the terminal device to perform:

determining whether the designated device ID is stored in the memory in response to being activated by the second program instructions stored in the memory; and accepting one of a first operation and a second operation through the input interface in response to the determining that the designated device ID different from the second device ID is stored, wherein the first program instructions cause the terminal device to:

perform, in response to accepting the first operation in the accepting, the overwriting the designated ID with the second device ID; and not perform, in response to accepting the second operation in the accepting, overwriting the designated ID with the second device ID.

6. The non-transitory computer-readable medium storing the first program instructions according to claim 5, the first program instructions further causing the terminal device to perform:

acquiring, in the acquiring the second device ID, function information indicating whether the second image processing device identified by the second device ID is capable of performing one or more specific processing out of the plurality of image processings;

accepting, in the accepting the designating the one of image processing devices, an operation for designating one of the image processing devices capable of performing all the specific processing, which are capable of being instructed by the first program instructions, out of the image processing devices communicable through a communication interface of the terminal device;

determining, in response to determining that the designated device ID different from the second device ID is stored, whether the second image processing device is capable of performing all the specific processing, which are capable of being instructed by the first program instructions based on the function information; and accepting, in response to determining that all the specific operations are capable of performing, one of the first operation and the second operation.

7. The non-transitory computer-readable medium storing the first program instructions according to claim 5, the first program instructions further causing the terminal device to:

perform, in response to determining that the designated device ID is not stored, accepting a third operation or a fourth operation through the input interface;

perform, in response to accepting the third operation in said accepting, the acquiring the second device ID; and perform, in response to accepting the fourth operation in said accepting, in the accepting the designating the one of image processing devices.

8. The non-transitory computer-readable medium storing the first program instructions according to claim 7, the first program instructions further causing the terminal device to:

acquire, the acquiring the second device ID, function information indicating whether the second image processing device identified by the second device ID is capable of performing one or more specific processing out of the plurality of image processings;

perform, in response to determining that the designated device ID is not stored, determining whether the second image processing device is capable of performing all the specific operations, which are capable of being instructed by the first program instructions, based on the function information;

perform, in response to determining that the image processing device is not capable of performing at least one of the specific operations, the accepting the third operation or the fourth operation through the input interface; and perform, in response to determining that the image processing is capable of performing all the specific operations, the acquiring the second device ID without the accepting the third operation or the fourth operation through the input interface.

9. The non-transitory computer-readable medium storing the first program instructions according to claim 6, wherein, previous to the determining whether the second image processing device identified by the second device ID is capable of performing all the specific operations, the first program instructions further cause the terminal device to perform:

determining whether the function information corresponding to all the specific operations executable by the first program instructions is acquired by the acquiring the second device ID; and receipting, in response to determining that the function information is not acquired, receiving the function information not acquired by the acquiring the second device ID from the second image processing device, through the communication interface.

10. The non-transitory computer-readable medium storing the first program instructions according to claim 4, the first program instructions further causing the terminal device to perform:
   acquiring, in the acquiring the second device ID, condition information indicating performing conditions of the image processing; and
   causing the memory to store the condition information acquired by the acquiring the second device ID,
   wherein the processing instruction information is information for causing the image processing of the designated contents to be performing according to the performing conditions indicated by the condition information stored in the memory.

11. The non-transitory computer-readable medium storing the first program instructions according to claim 10,
   wherein the condition information includes a plurality of parameters each corresponding to one of a plurality of items, and
   wherein the first program instructions further cause the terminal device to:
      perform determining whether a specific parameter of a specific item is included in the condition information acquired in the acquiring the second device ID; and
      perform, in response to determining that the specific parameter is included, the storing the condition information acquired by the acquiring the second device ID.

12. The non-transitory computer-readable medium storing the first program instructions according to claim 11, the first program instructions further causing the terminal device to: cause, the storing the condition information acquired by the acquiring the second device ID, the memory to store only the parameter corresponding to a target item different from the specific item, out of the plurality of parameters included in the condition information acquired in the acquiring the second device ID.

13. A non-transitory computer-readable medium storing program instructions to control a terminal device including: a memory storing external program instructions; an input interface; and a display, the program instructions, when executed by a computer of the terminal device, causing the terminal device to perform:
   accepting an operation designating the image processing device through the input interface;
   transmitting, processing instruction information for causing the designated image processing device to perform image processing;
   accepting an operation for designating the external program instructions stored in the memory, through the input interface; and
   activating the designated external program instructions and transferring a device ID for identifying the designated image processing device,
   wherein when the external program instructions are activated, the external program instructions causes the terminal device to perform:
      acquiring the device ID transferred by the program instructions; and
      displaying information about the image processing device identified by the device ID, on the display, to represent that an image processing is to be executed by the image processing device.

* * * * *